US012750090B2

(12) United States Patent
Zhu et al.

(10) Patent No.: US 12,750,090 B2
(45) Date of Patent: Sep. 29, 2026

(54) WIRELESS COMMUNICATION METHOD AND APPARATUS

(71) Applicant: Huawei Technologies Co., Ltd., Shenzhen (CN)

(72) Inventors: Haoren Zhu, Shanghai (CN); Hualin Zhu, Shanghai (CN); Yishan Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 402 days.

(21) Appl. No.: 18/361,552

(22) Filed: Jul. 28, 2023

(65) Prior Publication Data

US 2023/0379005 A1 Nov. 23, 2023

Related U.S. Application Data

(63) Continuation of application No. PCT/CN2021/074496, filed on Jan. 29, 2021.

(51) Int. Cl.
*H04B 5/77* (2024.01)
*H04W 40/24* (2009.01)

(52) U.S. Cl.
CPC .............. *H04B 5/77* (2024.01); *H04W 40/24* (2013.01)

(58) Field of Classification Search
CPC ........ G06K 7/01; H04W 40/22; H04W 24/02; H04W 40/24; H04W 40/248; H04W 88/14; H04B 5/77
See application file for complete search history.

(56) References Cited

U.S. PATENT DOCUMENTS

2009/0146792 A1* 6/2009 Sadr .......................... G06K 7/01 340/10.3
2010/0039228 A1* 2/2010 Sadr .......................... G01S 5/12 340/10.1
2017/0295531 A1* 10/2017 Singh .................. H04W 36/302
2019/0311163 A1* 10/2019 Sadr .................. G06K 7/10158
(Continued)

FOREIGN PATENT DOCUMENTS

CN 109815759 A 5/2019

OTHER PUBLICATIONS

3rd Generation Partnership Project; Technical Specification Group Radio Access Network; NR; NR and NG-RAN Overall Description; Stage 2 (Release 16), 3GPP TS 38.300 V16.4.0 (Dec. 2020), Technical Specification, total 149 pages.
(Continued)

*Primary Examiner* — Lester G Kincaid
(74) *Attorney, Agent, or Firm* — Slater Matsil, LLP

(57) ABSTRACT

This application provides a wireless communication method and apparatus, to flexibly adjust a receiver and an exciter that are used for radio frequency identification, thereby meeting application requirements of complex scenarios. The method includes: A central node determines a first topology between a receiver and an exciter based on first information, where the receiver and the exciter are used for radio frequency identification, and the first information includes status information of the receiver and/or status information of the exciter; and the central node sends second information to the receiver, where the second information indicates the first topology.

15 Claims, 12 Drawing Sheets

(56) References Cited

U.S. PATENT DOCUMENTS

2019/0313269 A1 * 10/2019 Keskitalo ........... H04B 7/15542

OTHER PUBLICATIONS

Huawei, "Bl CR to 38.401 Support for IAB", 3GPP TSG RAN WG3 Meeting #108-e, Online, Jun. 1-11, 2020, R3-203067, total 22 pages.
3rd Generation Partnership Project; Technical Specification Group Radio Access Network; NG-RAN; Architecture description (Release 16), 3GPP TS 38.401 V16.4.0 (Jan. 2021), Technical Specification, total 78 pages.
3rd Generation Partnership Project; Technical Specification Group Services and System Aspects; System architecture for the 5G System (5GS); Stage 2 (Release 16), 3GPP TS 23.501 V16.7.0 (Dec. 2020), Technical Specification, total 450 pages.
3GPP TS 38.401 V16.2.0 (Jul. 2020), 3rd Generation Partnership Project; Technical Specification Group Radio Access Network; NG-RAN; Architecture description (Release 16), total 77 pages.

* cited by examiner

WIRELESS COMMUNICATION METHOD AND APPARATUS

CROSS-REFERENCE TO RELATED APPLICATIONS

This application is a continuation of International Application No. PCT/CN2021/074496, filed on Jan. 29, 2021, the disclosure of which is hereby incorporated by reference in its entirety.

TECHNICAL FIELD

This application relates to the communication field, and more specifically, to a wireless communication method and apparatus.

BACKGROUND

Radio frequency identification (RFID) is a contactless automatic identification technology, and often referred to as an inductive electronic chip or a proximity card, an inductive card, a contactless card, an electronic tag, an electronic bar code, or the like. In RFID, a target object is automatically identified and related data is obtained through a radio frequency signal, and no manual intervention is required for identification. As a wireless version of a bar code, the RFID technology has advantages that the bar code does not have, for example, waterproof performance, anti-magnetic performance, high temperature resistance, a long service life, a long reading distance, encryptable data on a tag, a larger data storage capacity, and freely changed storage information, and application of the RFID technology brings revolutionary changes to retail and logistics industries.

To further improve accuracy and real-time performance of positioning of an RFID tag, an RFID reader can be separated into a receiver and an exciter, that is, a receiving antenna and a sending antenna are separated, so that self-interference of the original RFID reader can be reduced and receiving sensitivity of the receiver can be improved.

However, a current manner of binding the receiver and the exciter is inflexible, and cannot meet application requirements of complex scenarios. Therefore, a technology for flexibly adjusting the exciter and the receiver is urgently required.

SUMMARY

This application provides a wireless communication method and apparatus, to improve flexibility of determining a topology between an exciter and a receiver.

According to a first aspect, this application provides a wireless communication method, which may be performed by a central node or a chip in the central node. The method includes that the central node determines a first topology between a receiver and an exciter based on first information, where the receiver and the exciter are used for radio frequency identification, and the first information includes status information of the receiver and/or status information of the exciter; and the central node sends second information to the receiver, where the second information indicates the first topology.

For example, that the central node sends second information to the receiver, where the second information indicates the first topology includes: When the receiver is deployed on a second distributed node, the central node sends the second information to the second distributed node, and the second distributed node indicates the second information to the receiver through an internal interface; or when the receiver is deployed on the central node, the central node directly indicates the second information to the receiver through an internal interface.

For example, that the central node determines a first topology between a receiver and an exciter based on first information may have the following two meanings.

Meaning 1: The central node determines, based on the first information, the first topology between the exciter and the pre-configured receiver.

Meaning 2: That the central node determines a first topology between a receiver and an exciter based on first information includes: The central node determines the exciter, the receiver, and a network configuration or arrangement between the receiver and the exciter based on the first information.

That is, that the central node determines a first topology between a receiver and an exciter based on first information may be understood as that the central node determines, based on the first information, the first topology between the exciter and the pre-configured receiver; or may be understood that the central node selects the receiver and the exciter based on the first information, and determines a topology relationship between the receiver and the exciter. In other words, when determining the first topology, the central node may only determine a topology connection relationship between the receiver and the exciter, to obtain a better first topology; or may select the appropriate receiver and exciter when determining the first topology, and determine a topology connection relationship between the receiver and the exciter, to obtain a better first topology.

Optionally, that the second information indicates the first topology includes: The second information indicates binding information of the exciter and the receiver, or the second information includes an identifier of the exciter.

That is, the central node may send, to the receiver, the binding information of the exciter and the receiver, or a mapping relationship between the identifier of the exciter and an identifier of the receiver, or may send only the identifier of the exciter to the receiver, and the receiver is bound by default to the indicated exciter.

Optionally, the second information includes topology connection information between the exciter and the receiver.

According to this implementation of this application, the central node determines the topology relationship between the receiver and the exciter, and controls a communication link between the receiver and the exciter based on the topology relationship. The central node can determine or adjust the topology between the receiver and the exciter based on the status information of the receiver and/or the status information of the exciter, and the receiver and the exciter perform communication based on the topology. That is, the binding relationship between the receiver and the exciter is not statically configured, and the central node can flexibly adjust which receivers are bound to which exciters and how the receivers communicate with the exciters.

With reference to the first aspect, in some implementations of the first aspect, the method further includes: The central node sends third information to the exciter, where the third information indicates identification information of the receiver.

When the central node determines the exciter, the receiver, and the network configuration or arrangement between the receiver and the exciter based on the first information, the central node sends the identification information of the receiver to the exciter, or the central node sends the identification information and position information of the receiver to the exciter. Therefore, according to this implementation of this application, the central node can flexibly select an appropriate receiver to establish the topology relationship between the receiver and the exciter.

With reference to the first aspect, in some implementations of the first aspect, the method further includes: The central node sends indication information to the receiver, where the indication information indicates the receiver to establish a connection to the exciter, and the indication information includes identification information of the exciter.

With reference to the first aspect, in some implementations of the first aspect, the exciter is deployed on a first distributed node.

With reference to the first aspect, in some implementations of the first aspect, the receiver is deployed on the central node.

With reference to the first aspect, in some implementations of the first aspect, the receiver is deployed on a second distributed node.

With reference to the first aspect, in some implementations of the first aspect, the method is applied to an integrated access and backhaul IAB system, the central node is a donor node in the IAB system, the first distributed node is a first IAB node in the IAB system, and the second distributed node is a second IAB node in the IAB system.

According to this implementation of this application, the exciter and the receiver are deployed on nodes in the IAB system. The central node, namely, the donor node, can flexibly adjust the topology between the exciter and the receiver by controlling an IAB node.

With reference to the first aspect, in some implementations of the first aspect, when the receiver is deployed on the second distributed node, the method further includes: The central node receives fourth information from the receiver, where the fourth information indicates the central node to select a first access and mobility management function AMF network element. The central node determines the first AMF network element based on the fourth information, where the first AMF network element supports authorization of the receiver. The central node sends fifth information to the first AMF network element, where the fifth information indicates the first AMF network element to authorize the receiver. The central node receives sixth information from the first AMF network element, where the sixth information includes information about the receiver.

With reference to the first aspect, in some implementations of the first aspect, when the exciter is deployed on the first distributed node, the method further includes: The central node receives seventh information from the exciter, where the seventh information indicates the central node to select a second AMF network element. The central node determines the second AMF network element based on the seventh information, where the second AMF network element supports authorization of the exciter. The central node sends eighth information to the second AMF network element, where the eighth information indicates the second AMF network element to authorize the exciter. The central node receives ninth information from the AMF network element, where the ninth information includes information about the exciter.

According to this implementation of this application, the donor node selects, based on subscription information of the exciter and the receiver, an appropriate AMF network element to authorize the exciter and the receiver, and the IAB node obtains permission to a capability of enabling/using the exciter or the receiver, so that the IAB system can have a radio frequency identification capability.

With reference to the first aspect, in some implementations of the first aspect, the method further includes: The central node sends broadcast information, where the broadcast information indicates the first distributed node and/or the second distributed node to select a parent node.

According to this implementation of this application, the central node sends the broadcast information to indicate the first distributed node and/or the second distributed node to select an appropriate parent node. This can reduce complexity of determining the first topology by the central node.

With reference to the first aspect, in some implementations of the first aspect, the first information includes at least one of the following information: load information of the receiver, information about a maximum quantity of exciters supported by the receiver, or position information of the exciter.

With reference to the first aspect, in some implementations of the first aspect, the first information further includes information about a second topology, and the first topology is obtained by adjusting the second topology between the receiver and the exciter.

For example, the information about the second topology is at least one of the following information: a quantity of spaced nodes between the receiver and the exciter, a link load between the receiver and the exciter, link quality between the receiver and the exciter, or a redundant path between the receiver and the exciter.

According to a second aspect, this application provides a wireless communication method, which may be performed by an exciter or a chip in the exciter. The method includes: The exciter receives third information from a central node, where the third information indicates identification information of a receiver, the receiver is determined by the central node based on first information, the receiver and the exciter are used for radio frequency identification, and the first information includes status information of the receiver and/or status information of the exciter.

With reference to the second aspect, in some implementations of the second aspect, the exciter is deployed on a first distributed node.

With reference to the second aspect, in some implementations of the second aspect, the receiver is deployed on the central node.

With reference to the second aspect, in some implementations of the second aspect, the receiver is deployed on a second distributed node.

With reference to the second aspect, in some implementations of the second aspect, the method is applied to an IAB system, the central node is a donor node in the IAB system, the first distributed node is a first IAB node in the IAB system, and the second distributed node is a second IAB node in the IAB system.

With reference to the second aspect, in some implementations of the second aspect, the method further includes: The exciter sends seventh information to the central node, where the seventh information indicates the central node to select a second AMF network element, and the second AMF network element supports authorization of the exciter.

With reference to the second aspect, in some implementations of the second aspect, the exciter receives broadcast information from the central node, where the broadcast information indicates the exciter to select a parent node.

With reference to the second aspect, in some implementations of the second aspect, the first information includes at least one of the following information: load information of the receiver, information about a maximum quantity of exciters supported by the receiver, or position information of the exciter.

With reference to the second aspect, in some implementations of the second aspect, the first information further includes information about a second topology, and a first topology is obtained by adjusting the second topology between the receiver and the exciter.

For example, the information about the second topology is at least one of the following information: a quantity of spaced nodes between the receiver and the exciter, a link load between the receiver and the exciter, link quality between the receiver and the exciter, or a redundant path between the receiver and the exciter.

According to this implementation of this application, the central node determines a topology relationship between the receiver and the exciter. The central node can determine or adjust the topology between the receiver and the exciter based on the status information of the receiver and/or the status information of the exciter, and the receiver and the exciter perform communication based on the topology. That is, a binding relationship between the receiver and the exciter is not statically configured, and the central node can flexibly adjust which receivers are bound to which exciters and how the receivers communicate with the exciters.

According to a third aspect, this application provides a wireless communication method, which may be performed by a receiver or a chip in the receiver. The method includes: The receiver receives second information from a central node, where the second information indicates a first topology, the first topology is determined by the central node based on first information, the receiver and an exciter are used for radio frequency identification, and the first information includes status information of the receiver and/or status information of the exciter.

With reference to the third aspect, in some implementations of the third aspect, the exciter is deployed on a first distributed node.

With reference to the third aspect, in some implementations of the third aspect, the receiver is deployed on the central node.

With reference to the third aspect, in some implementations of the third aspect, the receiver is deployed on a second distributed node.

With reference to the third aspect, in some implementations of the third aspect, the method is applied to an IAB system, and the central node is a donor node in the IAB system.

With reference to the third aspect, in some implementations of the third aspect, the method further includes: The method is applied to an IAB system, the central node is a donor node in the IAB system, the first distributed node is a first IAB node in the IAB system, and the second distributed node is a second IAB node in the IAB system.

With reference to the third aspect, in some implementations of the third aspect, the first information includes at least one of the following information: load information of the receiver, information about a maximum quantity of exciters supported by the receiver, or position information of the exciter. With reference to the third aspect, in some implementations of the third aspect, the first information further includes information about a second topology, and the first topology is obtained by adjusting the second topology between the receiver and the exciter.

For example, the information about the second topology is at least one of the following information: a quantity of spaced nodes between the receiver and the exciter, a link load between the receiver and the exciter, link quality between the receiver and the exciter, or a redundant path between the receiver and the exciter.

According to this implementation of this application, the central node determines a topology relationship between the receiver and the exciter. The central node can determine or adjust the topology between the receiver and the exciter based on the status information of the receiver and/or the status information of the exciter, and the receiver and the exciter perform communication based on the topology. That is, a binding relationship between the receiver and the exciter is not statically configured, and the central node can flexibly adjust which receivers are bound to which exciters and how the receivers communicate with the exciters.

According to a fourth aspect, this application provides a wireless communication apparatus, where the apparatus has a function of implementing the method in any one of the first aspect and the possible implementations of the first aspect. The function may be implemented by hardware, or may be implemented by hardware executing corresponding software. The hardware or the software includes one or more units corresponding to the foregoing functions.

According to a fifth aspect, this application provides a wireless communication apparatus, where the apparatus has a function of implementing the method in any one of the second aspect and the possible implementations of the second aspect. The function may be implemented by hardware, or may be implemented by hardware executing corresponding software. The hardware or the software includes one or more units corresponding to the foregoing functions.

According to a sixth aspect, this application provides a wireless communication apparatus, where the apparatus has a function of implementing the method in any one of the third aspect and the possible implementations of the third aspect. The function may be implemented by hardware, or may be implemented by hardware executing corresponding software. The hardware or the software includes one or more units corresponding to the foregoing functions.

According to a seventh aspect, this application provides a network device, including a processor and a memory. The memory is configured to store a computer program, and the processor is configured to invoke the computer program stored in the memory and run the computer program, so that the network device performs the method in any one of the first aspect or the possible implementations of the first aspect.

According to an eighth aspect, this application provides a network device, including a processor and a memory. The memory is configured to store a computer program, and the processor is configured to invoke the computer program stored in the memory and run the computer program, so that the network device performs the method in any one of the second aspect or the possible implementations of the second aspect.

According to a ninth aspect, this application provides a network device, including a processor and a memory. The memory is configured to store a computer program, and the processor is configured to invoke the computer program stored in the memory and run the computer program, so that the network device performs the method in any one of the third aspect or the possible implementations of the third aspect.

According to a tenth aspect, this application provides a chip, including a processor. The processor is configured to read a computer program stored in a memory and execute the computer program, to perform the method according to any one of the first aspect or the possible implementations of the first aspect.

Optionally, the chip further includes the memory, the memory and the processor are connected through a circuit or a wire, and the memory is configured to store the computer program.

Optionally, the chip further includes a communication interface.

According to an eleventh aspect, this application provides a chip, including a processor. The processor is configured to read a computer program stored in a memory and execute the computer program, to perform the method according to any one of the second aspect or the possible implementations of the second aspect.

Optionally, the chip further includes the memory, the memory and the processor are connected through a circuit or a wire, and the memory is configured to store the computer program.

Optionally, the chip further includes a communication interface.

According to a twelfth aspect, this application provides a chip, including a processor. The processor is configured to read a computer program stored in a memory and execute the computer program, to perform the method according to any one of the third aspect or the possible implementations of the third aspect.

Optionally, the chip further includes the memory, the memory and the processor are connected through a circuit or a wire, and the memory is configured to store the computer program.

Optionally, the chip further includes a communication interface.

According to a thirteenth aspect, this application further provides a computer program product. The computer program product includes computer program code. When the computer program code is run on a computer, the computer is enabled to perform the method in any one of the first aspect and the possible implementations of the first aspect.

According to a fourteenth aspect, this application further provides a computer program product. The computer program product includes computer program code. When the computer program code is run on a computer, the computer is enabled to perform the method in any one of the second aspect and the possible implementations of the second aspect.

According to a fifteenth aspect, this application further provides a computer program product. The computer program product includes computer program code. When the computer program code is run on a computer, the computer is enabled to perform the method according to any one of the third aspect or the possible implementations of the third aspect.

According to a sixteenth aspect, this application further provides a computer storage medium. The computer-readable storage medium stores computer instructions. When the computer instructions are run on a computer, the computer is enabled to perform the method according to any one of the first aspect or the possible implementations of the first aspect.

According to a seventeenth aspect, this application further provides a computer storage medium. The computer-readable storage medium stores computer instructions. When the computer instructions are run on a computer, the computer is enabled to perform the method according to any one of the second aspect or the possible implementations of the second aspect.

According to an eighteenth aspect, this application further provides a computer storage medium. The computer-readable storage medium stores computer instructions. When the computer instructions are run on a computer, the computer is enabled to perform the method in any one of the third aspect or the possible implementations of the third aspect.

According to implementations of this application, the central node can flexibly determine the exciter, the receiver, and the topology relationship between the exciter and the receiver. That is, selection and the topology of the exciter and the receiver can be determined based on the status information of the exciter, the status information of the receiver, or topology information before adjustment. This improves flexibility of determining the topology between the exciter and the receiver.

DETAILED DESCRIPTION OF ILLUSTRATIVE EMBODIMENTS

Figure 1:
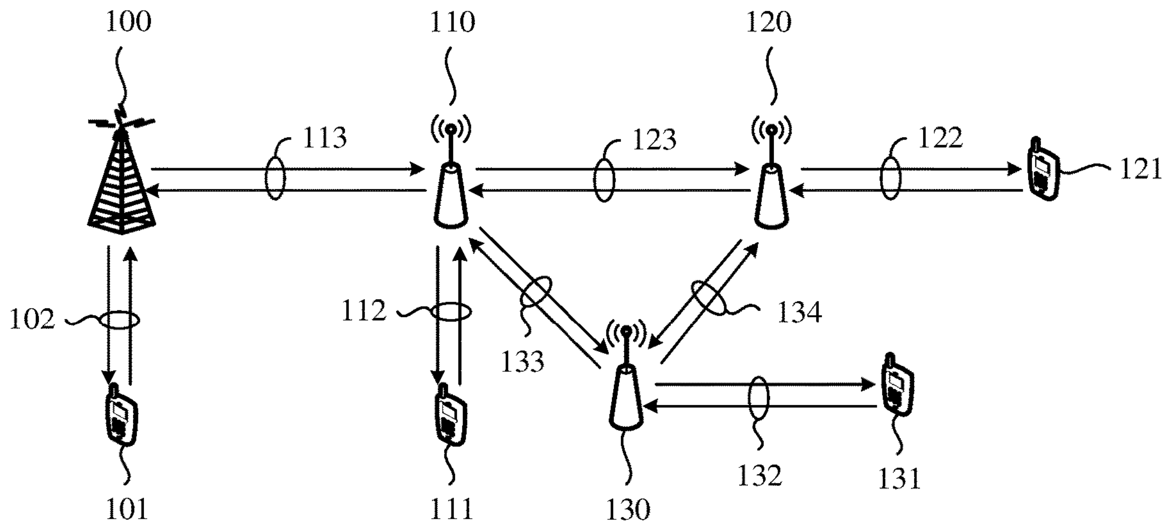
FIG. 1 is a diagram of an architecture of an IAB system to which an embodiment of this application is applied.

The following describes the technical solutions of this application with reference to accompanying drawings.

The technical solutions in embodiments of this application are applied to various communication systems, for example, a long term evolution (LTE) system, an LTE frequency division duplex (FDD) system, an LTE time division duplex (TDD) system, a universal mobile telecommunications system (UMTS), a 5th generation (5G) system, a 6th generation (6G) system in the future, or a new radio (NR) system.

A terminal device may be a device that provides voice/data connectivity for a user, for example, a handheld device with a wireless connection function or a vehicle-mounted device. Currently, some examples of the terminal are as follows: a mobile phone, a tablet computer, a notebook computer, a palmtop computer, a mobile internet device (mobile internet device, MID), a wearable device, a virtual reality (VR) device, an augmented reality (AR) device, a wireless terminal in industrial control, a wireless terminal in self-driving, a wireless terminal in remote surgery, a wireless terminal in smart grid, a wireless terminal in transportation security, a wireless terminal in smart city, a wireless terminal in smart home, a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network, or a terminal device in a public land mobile communication network (PLMN). This is not limited in embodiments of this application.

An access network device is a device in a RAN, in other words, a RAN node that connects a terminal device to a wireless network. By way of example and not limitation, the access network device may be a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), or a wireless fidelity (Wi-Fi) access point (AP). In a network structure, the access network device may include a central unit (centralized unit, CU) node, a distributed unit (DU) node, a RAN device including a CU node and a DU node, or a RAN device including a CU control plane node (CU-CP node), a CU user plane node (CU-UP node), and a DU node.

A wireless backhaul node (also be referred to as an IAB node) is configured to provide a wireless backhaul service. The wireless backhaul service is a data and/or signaling service provided through a wireless backhaul link. The IAB node is a specific name of a relay node, and does not constitute a limitation on the solutions in this application. The IAB node may be the foregoing base station or terminal device having a forwarding function, or may be in an independent device form. In a network including the IAB node (briefly referred to as an IAB network below), the IAB node may provide a wireless access service for a terminal, and is connected to a donor base station (donor gNB) through a wireless backhaul link to transmit service data of a user.

For example, the IAB node may alternatively be a device such as customer premises equipment (CPE) or a residential gateway (RG). In this case, a method provided in embodiments of this application may be applied to a home access scenario.

FIG. 1 is a diagram of an architecture of an IAB system to which the technical solutions of this application are applied. As shown in FIG. 1, the IAB system includes at least: one base station 100, one or more terminal devices 101 served by the base station 100, one or more relay nodes (namely, IAB nodes) no, and one or more terminal devices in served by the IAB node no. The IAB node no is connected to the base station 100 through a wireless backhaul link 113. The base station 100 is usually referred to as a donor base station. Alternatively, the donor base station is also referred to as a donor node, or an IAB donor in this application. In addition, the IAB system may further include one or more intermediate IAB nodes, for example, an IAB node 120 and an IAB node 130.

The donor base station may be an access network element that has a complete base station function, or may be in a form in which a central unit (CU) and a distributed unit (DU) are separated. That is, the donor node includes the central unit in the donor base station and the distributed unit in the donor base station. In this specification, the central unit in the donor node is also referred to as an IAB donor CU (also referred to as a donor CU, or directly referred to as a CU). The distributed unit in the donor node is also referred to as an IAB donor DU (or referred to as a donor DU). The donor CU may also be a form in which a control plane (CP) and a user plane (UP) (CU-UP for short in this specification) are separated. For example, a CU may include one CU-CP and one or more CU-UPs.

The following describes some terms in embodiments of this application, to facilitate understanding of a person skilled in the art.

(1) IAB System

1. Basic Concept

Link: A link is a path between two neighboring nodes on a path.

Access link: An access link is a link between a terminal device and a base station, a link between a terminal device and an IAB node, a link between a terminal device and a donor node, or a link between a terminal device and a donor DU. Alternatively, the access link includes a wireless link used when an IAB node serves as a common terminal device to communicate with a parent node of the IAB node. When serving as the common terminal device, the IAB node does not provide a backhaul service for any child node. The access link includes an uplink access link and a downlink access link. In this application, an access link of a terminal device is a wireless link. Therefore, the access link may also be referred to as a wireless access link.

Backhaul link: A backhaul link is a link between an IAB node and a parent node when the IAB node serves as a wireless backhaul node. When serving as the wireless backhaul node, the IAB node provides a wireless backhaul service for a child node. The backhaul link includes an uplink backhaul link and a downlink backhaul link. In this application, a backhaul link between an IAB node and a parent node is a wireless link. Therefore, the backhaul link may also be referred to as a wireless backhaul link.

Parent node and child node: Each IAB node considers a neighboring node that provides a wireless access service and/or a wireless backhaul service for the IAB node as a parent node. Accordingly, each IAB node may be considered as a child node of the parent node of the IAB node.

Alternatively, the child node may also be referred to as a lower-level node, and the parent node may also be referred to as an upper-level node.

Previous-hop node of a node: A previous-hop node of a node is a last node that is on a path including the node and that receives a data packet before the node. It may be understood that the previous-hop node of the node may include a previous-hop node of the node in uplink transmission and a previous-hop node of the node in downlink transmission.

Next-hop node of a node: A next-hop node of a node is a first node that is on a path including the node and that receives a data packet after the node. It may be understood that the next-hop node of the node may include a next-hop node of the node in uplink transmission and a next-hop node of the node in downlink transmission.

Ingress link of a node: An ingress link of a node is a link between the node and a previous-hop node of the node, and may also be referred to as a previous-hop link of the node. It may be understood that the ingress link of the node may include an ingress link of the node in uplink transmission and an ingress link of the node in downlink transmission.

Egress link of a node: An egress link of a node is a link between the node and a next-hop node of the node, and may also be referred to as a next-hop link of the node. It may be understood that the egress link of the node may include an egress link of the node in uplink transmission and an egress link of the node in downlink transmission.

Access IAB node: An access IAB node is an IAB node accessed by a terminal, or an IAB node that provides an access service for a terminal device.

Intermediate IAB node: An intermediate IAB node is an IAB node that provides a wireless backhaul service for another IAB node (for example, an access IAB node or another intermediate IAB node).

Route selection: Route selection is used to select a next-hop node for a data packet.

2. Composition of an IAB Node

The IAB node may have a part of a mobile terminal (MT) and a part of a DU. The IAB node communicates with its parent node by using the MT part, and the IAB node communicates with its child nodes by using the DU part (the child node may be a terminal or another IAB node). The IAB node may establish a backhaul connection to at least one parent node of the IAB node by using the MT part. The DU part of the IAB node may provide an access service for a terminal or an MT part of another IAB node. Descriptions are provided below by using an example with reference to FIG. 2.

Figure 2:
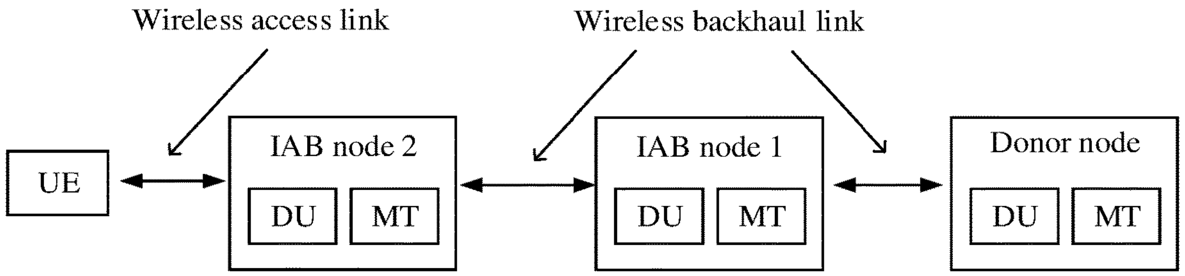
FIG. 2 is a schematic diagram of composition of an IAB node.

FIG. 2 is a schematic diagram of composition of an IAB node. UE is connected to a donor node by using an IAB node 2 and an IAB node 1. The IAB node 1 and the IAB node 2 each include a DU part and an MT part. The DU part of the IAB node 2 provides an access service for the UE. The DU part of the IAB node 1 provides an access service for the MT part of the IAB node 2. A DU part of the donor node provides an access service for the MT part of the IAB node 1.

For ease of understanding, a protocol stack of an IAB network further needs to be described. The protocol stack of the IAB network includes a user plane protocol stack and a control plane protocol stack.

3. Protocol Stack Architecture of an Access IAB Node, an Intermediate IAB Node, a Donor-DU, a Donor-CU, and a Terminal Device A protocol stack of an access IAB node on a user plane is different from a protocol stack of an access IAB node on a control plane. For details, refer to an IAB node 1 shown in each of FIG. 4 and FIG. 5.

Figure 3:
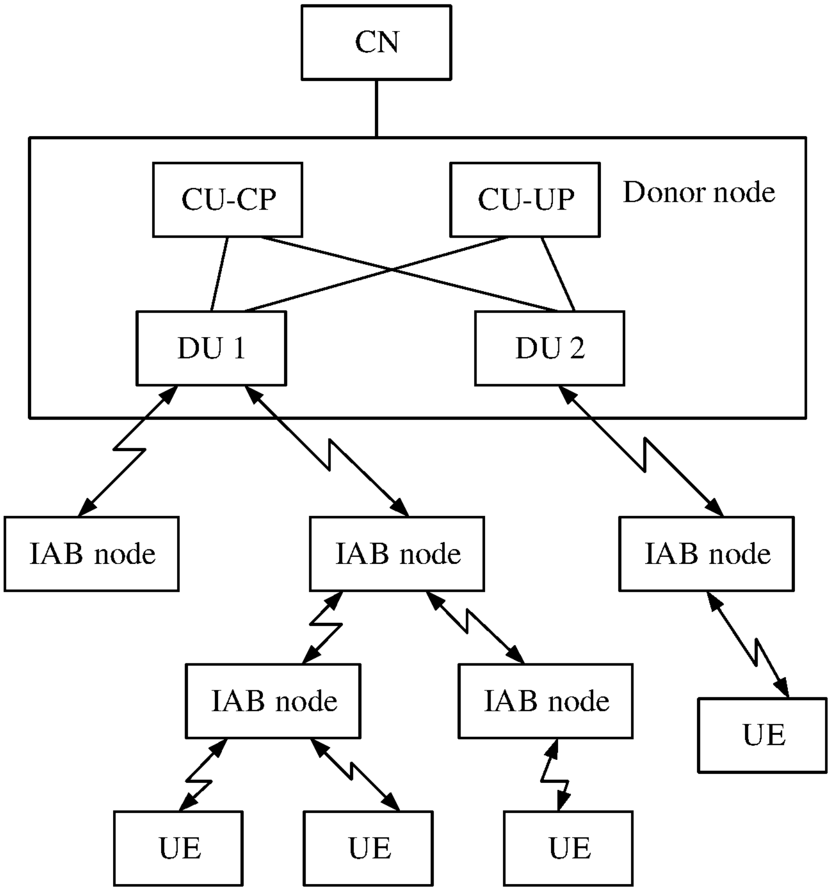
FIG. 3 is an example of an IAB system.

FIG. 3 is an example of an IAB system. As shown in FIG. 3, the IAB system mainly includes a donor node and IAB nodes. The IAB nodes are cascaded in a directed acyclic graph. During cascading, each IAB node may perform a non-access stratum (NAS) authentication, and complete an operation administration and maintenance (OAM) configuration by using a protocol data unit (PDU) session. The donor node may manage all the IAB nodes.

It should be noted that the donor node and the IAB node are examples of a central node and a distributed node respectively, and this application may be applied to a system including another central node and another distributed node.

Figure 4:
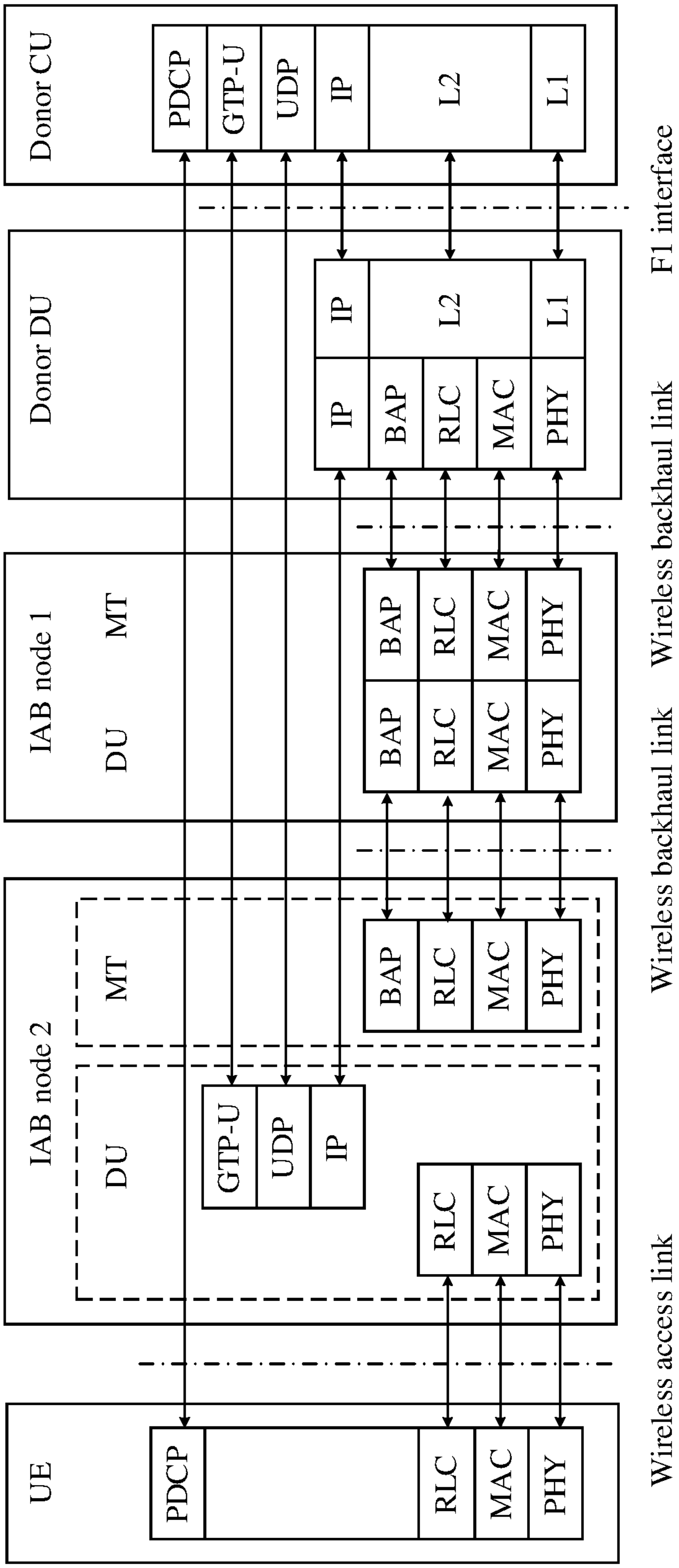
FIG. 4 shows an example of a user plane protocol stack architecture of a multi-hop IAB network.

FIG. 4 shows an example of a user plane protocol stack architecture of a multi-hop IAB network. As shown in FIG. 4, meanings of protocol layers in the protocol architecture shown in FIG. 4 are a backhaul adaptation protocol (backhaul adaptation protocol, BAP) layer, a packet data convergence protocol (PDCP) layer, a general packet radio service tunneling protocol user plane (GTP-U) layer, a user datagram protocol (UDP) layer, an internet protocol (IP) layer, a layer 2 (L2) layer, a layer 1 (L1) layer, a radio link control (RLC) layer, a media access control (MAC) layer, a physical (PHY) layer, a radio resource control (RRC) layer, an F1 application protocol (F1AP) layer, and a stream control transmission protocol (SCTP) layer. The L2 layer is a link layer. For example, the L2 layer may be a data link layer in an open systems interconnection (OSI) reference model. The L1 layer may be a physical layer. For example, the L1 layer may be a physical layer in an OSI reference model.

A protocol layer entity corresponding to each protocol layer is configured for each protocol layer, for example, a PDCP entity, an RLC entity, and a MAC entity. In uplink transmission, after corresponding processing is performed on a data packet (for example, an IP data packet) of UE at a PDCP layer, the data packet is sent to a PHY layer of an access backhaul node (for example, an IAB node 2 shown in FIG. 5) through an RLC layer, a MAC layer, and a PHY layer in sequence.

When an IAB node serves as a wireless terminal, a protocol stack of a communication link between the IAB node and a parent node is the same as a protocol stack of a radio access link between the UE and an access IAB node, and a protocol stack between the IAB node and a donor CU is the same as a protocol stack between the UE and the donor CU.

In addition, FIG. 4 further shows a user plane protocol stack of an F1 interface between a donor CU and an access IAB node (for example, an IAB node 2 in FIG. 4). A GTP-U tunnel established on the F1 interface by using a GTP-U protocol layer is in one-to-one correspondence with a data radio bearer DRB of the UE. In other words, each radio bearer of the UE has a GTP tunnel in one-to-one correspondence with the radio bearer.

Figure 5:
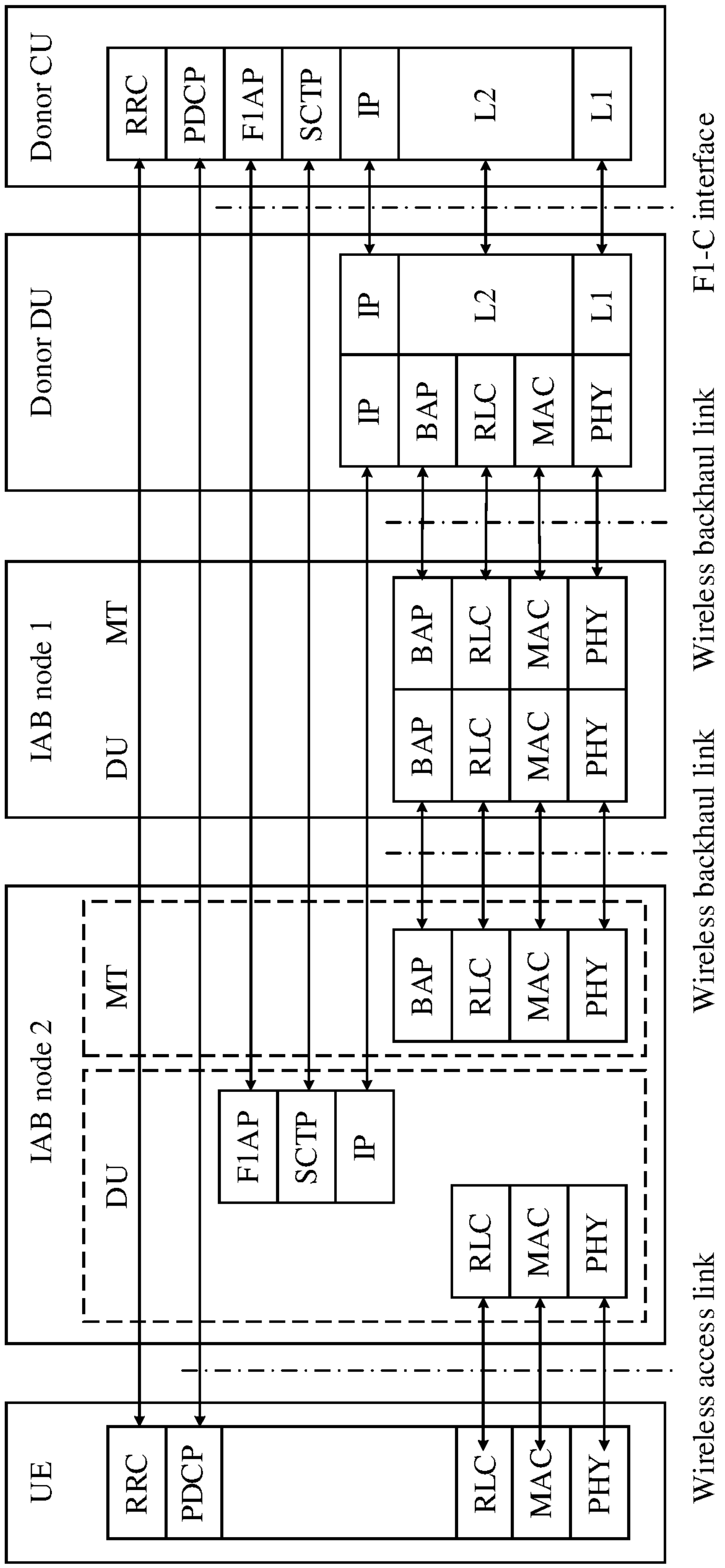
FIG. 5 shows an example of a control plane protocol stack architecture of a multi-hop IAB network.

FIG. 5 shows an example of a control plane protocol stack architecture of a multi-hop IAB network. The descriptions of the protocol layers in FIG. 4 are also applied to FIG. 5, but there are some differences. For example, an F1 control plane (F1-C) protocol stack is used for an F1 interface between an access IAB node and a donor CU in FIG. 5.

It should be noted that, FIG. 4 and FIG. 5 respectively show an example of an end-to-end user plane protocol stack architecture and an example of an end-to-end control plane protocol stack architecture for transmitting a data service of UE in the IAB network. Optionally, there may be another possibility for the protocol stack architecture. For example, when a protocol stack used for security protection is introduced to the F1 interface between the IAB node 2 and the donor CU, the protocol stack architecture changes.

In addition, if the donor node is an entity with a complete function, the IAB donor reserves protocol stacks of the donor DU and the donor CU to an external node interface, and a protocol stack on an internal interface between the donor DU and the donor CU is not necessary. Similarly, protocol stacks of a DU part and an MT part of the IAB node may not be distinguished externally, and only a protocol stack to an external node interface is uniformly displayed.

In addition, regardless of the control plane protocol stack architecture or the user plane protocol stack architecture, when the donor-DU is an agent node for the F1 interface between the donor-CU and the IAB node, the user plane protocol stack architecture oriented to the access IAB node in the donor-DU may include, above an IP layer, a UDP layer and a GTP-U layer that are respectively equivalent to a UDP layer and a GTP-U layer in the protocol stack architecture of the DU part in the access IAB node, and may further include an IPsec layer equivalent to that in the DU part of the access IAB node. The control plane protocol stack architecture oriented to the access IAB node in the donor-DU may include, above an IP layer, an SCTP layer and an F1AP layer that are respectively equivalent to an SCTP layer and an F1AP layer in the protocol stack architecture of the DU part of the access IAB node, and may further include an IPsec layer or a DTLS layer equivalent to that in the DU part of the access IAB node.

4. F1 Interface and Protocol Layer of the F1 Interface

The F1 interface is a logical interface between a DU part of an IAB node and a donor node (or a donor-CU or a donor-DU). The F1 interface may also be referred to as an F1* interface, and supports a user plane and a control plane. The protocol layer of the F1 interface is a communication protocol layer on the F1 interface.

For example, a user plane protocol layer of the F1 interface may include one or more of an IP layer, a UDP layer, and a GTP-U layer. Optionally, the user plane protocol layer of the F1 interface further includes a PDCP layer and/or an IP security (IPsec) layer.

For example, a control plane protocol layer of the F1 interface may include one or more of an IP layer, an F1AP layer, and an SCTP layer. Optionally, the control plane protocol layer of the F1 interface further includes one or more of a PDCP layer, an IPsec layer, and a datagram transport layer security (DTLS) layer.

It should be noted that the IAB node may further support Uu, E1, NG, and X2 interfaces. For brevity, details are not described herein again.

(2) Radio Frequency

1. Separate Radio Frequency

Figure 6:
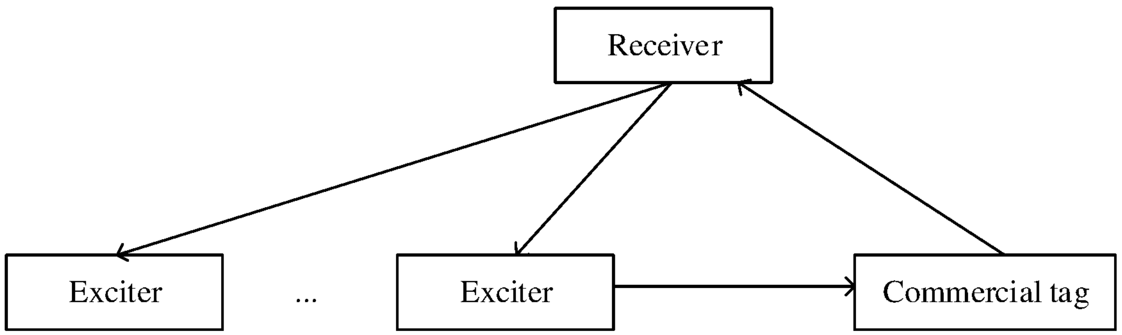
FIG. 6 is a schematic diagram of separate RFID.

FIG. 6 shows an example of a separate wireless radio frequency (universal subscriber identity module, RFID). Compared with a conventional RFID architecture, an RFID separation architecture may divide a reader/writer into a receiver and an exciter. A receiving link of the original reader/writer is included in the receiver, and a sending link of the original reader/writer is included in the exciter. Refer to FIG. 6. When sending a downlink command to an RFID tag, the receiver needs to first send the downlink command to the exciter, and the exciter forwards the downlink command to the RFID tag. When sending uplink data, the RFID tag directly sends the uplink data to the receiver.

When counting of the RFID tag is implemented in the RFID separation architecture, downlink signaling sent by the receiver needs to be forwarded to the RFID tag by using the exciter. Therefore, in large-scale deployment, there may be a plurality of exciters, that is, the receiver may be bound to a plurality of exciters and manage these exciters, and select an exciter to forward a downlink management command.

2. Exciter

In this application, the exciter may also be referred to as an exciter node or a helper node. The exciter is deployed on an IAB node in an IAB system, and may be considered as an upper-layer function module in the IAB node and may invoke a communication interface of a DU or an MT for communication.

2. Receiver

In this application, the receiver may also be referred to as a receiving node or a receiver node. The receiver may be deployed on an IAB node or a donor node in an IAB system. Similarly, the receiver may also be considered as an upper-layer function module in the IAB node or the donor node, and may invoke a communication interface of a DU or an MT for communication.

(3) Network Element

The following describes only some related network elements.

1. Access Management Network Element

The access management network element is mainly used for mobility management, access management, and the like, and may be configured to implement functions, for example, lawful interception and access authorization/authentication, other than session management in functions of a mobility management entity (mobility management entity, MME). In a 5G communication system, the access management network element may be an access and mobility management function (AMF) network element. In a future communication system, the access management network element may still be an AMF network element, or may have another name. This is not limited in this application. In this application, the AMF network element may be responsible for related authorization of an IAB node, an exciter, and a receiver.

2. Authentication Server

The authentication server is configured to: perform service authentication, generate a key to implement bidirectional authentication on a terminal device, and support a unified authentication framework. In a 5G communication system, the authentication server may be an authentication server function (AUSF) network element. In a future communication system, the authentication server function network element may still be an AUSF network element, or may have another name. This is not limited in this application.

3. Data Management Network Element

The data management network element is used for processing an identifier of a terminal device, access authentication, registration, and mobility management. In a 5G communication system, the data management network element may be a unified data management (UDM) network element, or may be a unified database function (UDR) network element. In this application, the data management network element may be an RFID-H network element. The RFID-H network element may be a network element newly deployed in a core network and being responsible for RFID-related functions, such as authentication, authorization, counting, or a tag read/write agent, related to RFID, and is deployed together with an existing core network element, or may be used as a function module in an existing core network element to be responsible for an RFID-related function. This is not limited in this application.

A procedure of this application is described in detail below with reference to FIG. 7 to FIG. 11.

This application may be applied to any system including a central node and a distributed node. The following uses an IAB system as an example, and this application is not limited.

Figure 7:
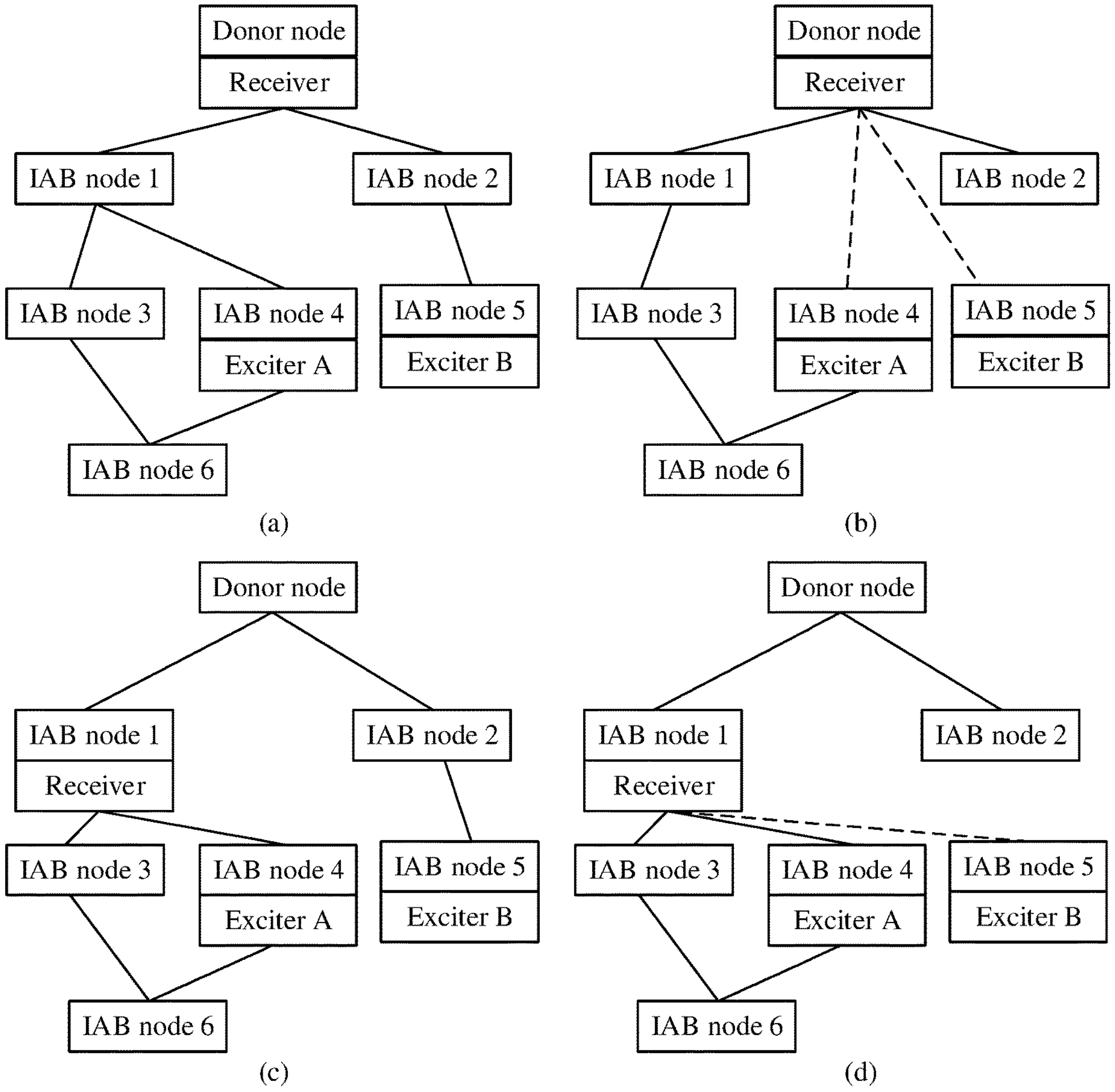
FIG. 7 is a schematic diagram of adjustment of a topology between a receiver and an exciter.

FIG. 7 shows examples of deploying a receiver and exciters in an IAB system. Refer to (a) in FIG. 7. The receiver is deployed on a donor node, an exciter A is deployed on an IAB node 4, and an exciter B is deployed on an IAB node 5. The exciter A is connected to the receiver by using an IAB node 1, and the exciter B is connected to the receiver by using an IAB node 2. That is, both the exciter A and the exciter B need to be connected to the receiver by using an extra 1-hop IAB node. This certainly increases extra latency overheads. (b) in FIG. 7 shows a new topology obtained by adjusting that in (a) in FIG. 7. Refer to (b) in FIG. 7, both the IAB node 4 and the IAB node 5 are directly connected to the donor node. That is, both the exciter A and the exciter B can directly communicate with the receiver. The topology in (b) in FIG. 7 has a smaller latency than that in (a) in FIG. 7.

In another possible implementation, refer to (c) in FIG. 7. In this case, the receiver is deployed on the IAB node 1, the exciter A and the exciter B are still deployed on the IAB node 4 and the IAB node 5, and the exciter B is not directly connected to the receiver. (d) in FIG. 7 is a new topology obtained by adjusting (c) in FIG. 7. In this case, the IAB node 5 where the exciter B is located is directly connected to the IAB node 1. That is, a better routing topology is obtained.

Figure 8:
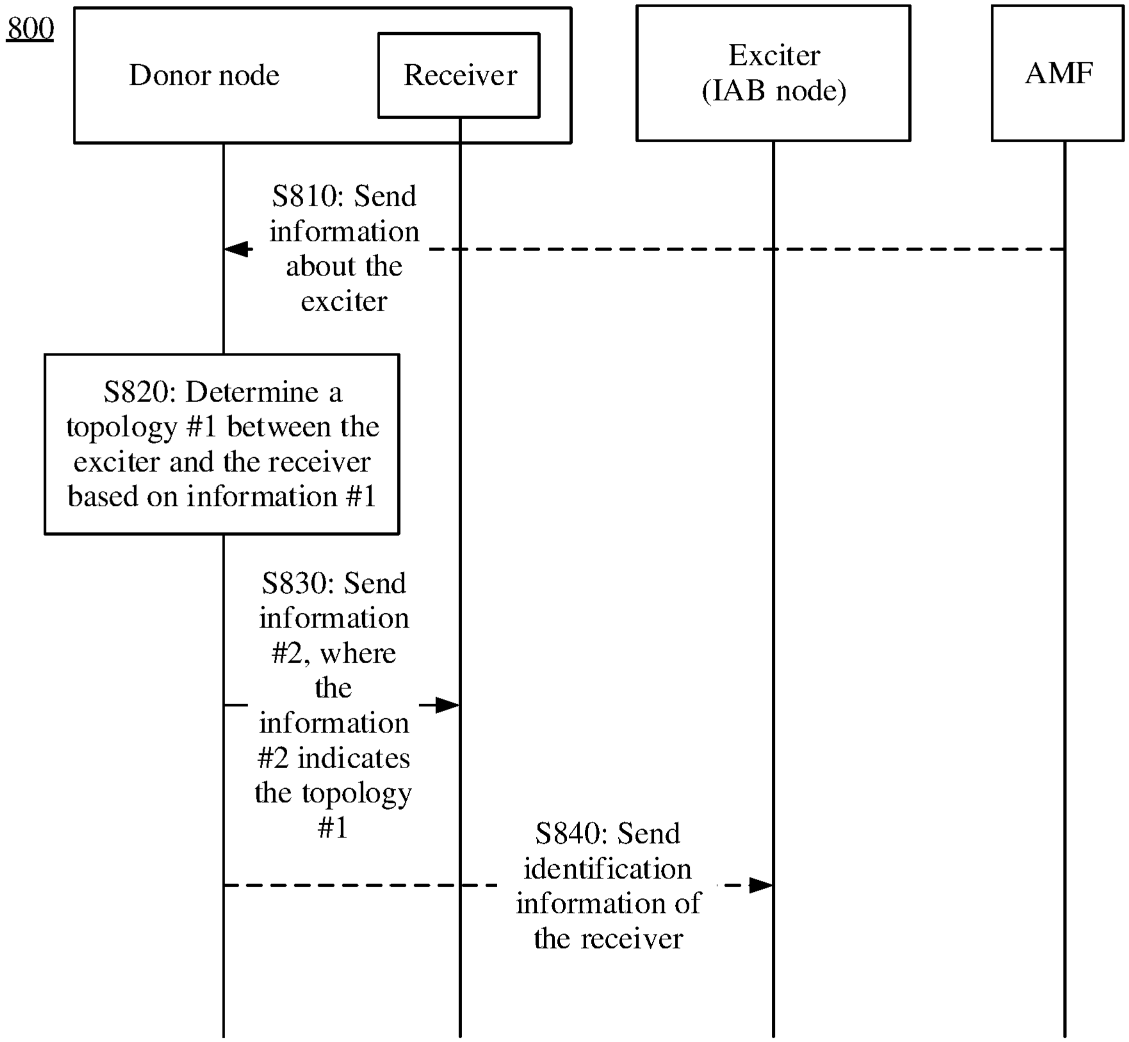
FIG. 8 is a schematic flowchart of an example of determining a topology between a receiver and an exciter.

FIG. 8 shows a schematic procedure of a communication method 800 according to this application when a receiver is deployed on a donor node. In the method 800, the receiver is deployed on an IAB node (an example of a second distributed node), and the receiver is deployed on the donor node (an example of a central node).

In a possible implementation, S810: The donor node (the example of the central node) receives information (an example of ninth information) about the exciter from an AMF network element.

It should be noted that, when the exciter is deployed on the IAB node, the information about the exciter may be information about the IAB node on which the exciter is deployed.

The AMF network element may send the information about the exciter to the donor node when the AMF network element authorizes the exciter or may send the information about the IAB node and the information about the exciter together to the donor node when the AMF network element authorizes the IAB node. That is, in an IAB scenario, after an IAB function is authorized, the AMF network element may send an IAB authorization indication to the donor node by using an N2 message, and the AMF network element may also include the information about the exciter in the N2 message and send the information about the exciter to the donor node.

S820: The donor node determines a topology #1 (an example of a first topology) between the receiver and the exciter based on information #1 (an example of first information).

The information #1 may include status information of the receiver and/or status information of the exciter. The status information of the receiver may be at least one of the following information: load information of the receiver, or information about a maximum quantity of exciters supported by the receiver. The status information of the exciter may be position information of the exciter.

When the donor node obtains the topology #1 by adjusting an original topology #2 (an example of a second topology), the information #1 may include information about the topology #2. For example, the information about the topology #2 may be a quantity of spaced nodes between the receiver and the exciter, a link load between the receiver and the exciter, link quality between the receiver and the exciter, or a redundant path between the receiver and the exciter.

For example, the donor node determines the topology #1 based on an average quantity of spaced nodes between the receiver and the exciter, or determines the topology #1 based on a quantity of spaced nodes between some exciters and the receiver.

For another example, the donor node determines the topology #1 based on an average link load, or a maximum link load, or a load between some links between the receiver and the exciter.

For still another example, the donor node determines the topology #1 based on link quality of each link or worst link quality of all links. The link quality may be average link quality, or historical instantaneous worst link quality. Link quality may be measured based on features such as a packet loss rate, a latency, and a jitter.

The foregoing description about the information #1 is merely an example. In this application, the donor node may use all factors that affect the topology as the information #1. This is not limited in this application.

It should be noted that the donor node determines a topology #1 between the receiver and the exciter based on information #1 may be understood as that the donor node determines the topology #1 between the exciter and the pre-configured receiver based on the information #1, or may be understood that the donor node selects the receiver and the exciter based on the information #1, and determines a topological relationship between the receiver and the exciter. In other words, when determining the topology #1, the donor node may only determine a topology connection relationship between the receiver and the exciter, to obtain a better topology #1; or may select the appropriate receiver and exciter when determining the topology #1, and determine a topology connection relationship between the receiver and the exciter, to obtain a better first topology #1.

When the donor node further determines the receiver and/or the exciter when determining the topology #1, the donor node may further bind the receiver and the exciter. A representation form of binding the exciter to the receiver in the donor node may be constructing a mapping relationship between an identifier of the receiver and an identifier of the exciter. It should be noted that, when the receiver is deployed on the donor node, an identifier of the donor node may be used to replace the identifier of the receiver. When the exciter is deployed on the IAB node, an identifier of the IAB node may be used to replace the identifier of the exciter. The identifier of the IAB node may be an identifier of a mobile terminal (MT) (for example, a cell radio network temporary identity (C-RNTI)), a 5G temporary mobile subscriber identity (5G-serving-temporary mobile subscriber identity, 5G-S-TMSI), or a DU identity (for example, a radio network layer/transport network layer identity (RNL/TNL ID)).

It should be noted that, when the receiver is deployed on the donor node, communication between the donor node and the receiver may be performed through an internal interface. For example, after binding the receiver and the exciter, the donor node may send binding information and the information about the exciter to the receiver through the internal interface, for example, send the information to the receiver by using an F1-C/F1-U/RRC message.

S830: The donor node sends information #2 (an example of second information) to the receiver, where the information #2 indicates the topology #1.

Optionally, the information #2 includes the binding information of the exciter and the receiver, or includes the identification information of the exciter. For example, the binding information may be identified in a plurality of manners. For example, a cell, a message, or a data structure includes the identifier of the receiver and the identifier of the exciter to indicate binding between the receiver and the exciter in the cell, the message, or the data structure. That is, the donor node may send, to the receiver, the binding information of the exciter and the receiver, or the mapping relationship between the identifier of the exciter and the identifier of the receiver, or may send only the identifier of the exciter to the receiver, and the receiver is bound by default to the indicated exciter.

Optionally, the information #2 includes topology connection information between the exciter and the receiver. For example, the topology connection information may include the identification information of the exciter and information about a path to the exciter. The information about the path indicates a path that needs to be passed when the receiver sends data to the exciter. For example, the information about the path may be represented by identification information of the path or identification information of a node on the path.

The topology connection information may include the binding information and the identifier of the exciter. That is, the topology connection information further indicates a mapping relationship between the exciter and the receiver. Optionally, it may be obtained from the topology connection information between a receiver #1 and an exciter #1, that the receiver #1 is bound to the exciter #1. Optionally, when the receiver #1 is directly connected to the exciter #1, binding information of the receiver #1 and the exciter #1, or identification information of the exciter #1 included in the information #2 may be understood as the topology connection information between the exciter #1 and the receiver 1.

When the information #2 further includes the binding information or the identification information of the exciter in addition to the topology connection information, it may be understood that the mapping relationship between the receiver and the exciter is determined based on the binding information or the identification information of the exciter rather than the topology connection information.

The topology connection information may be topology connection information between IAB nodes. The topology connection information may indicate the topology #1 and another topology relationship between the IAB nodes. Optionally, the information #2 further includes an association relationship between an IAB node and a receiver or an exciter deployed on the IAB node. That is, the topology connection information may be represented by using an IAB node on which the exciter is located. The IAB node may be represented in a plurality of manners, for example, represented by using the identification information of the IAB node described above, for example, represented by using an IP address or a MAC address.

Specific content of the topology connection information may be used to determine a position of the exciter. That is, the topology connection information may be understood as the position information of the exciter.

Optionally, the information #2 may be carried in one message and sent to the receiver, or information in the information #2 may be carried in different messages and sent to the receiver separately.

Optionally, when the receiver may determine the position information of the exciter based on the identification information of the exciter, the receiver does not need to additionally obtain the position information of the exciter.

Optionally, the receiver may actively establish a connection to the exciter based on the information #2.

Optionally, the receiver may adjust topology information on the receiver based on the information #2.

It should be noted that the topology #1 may be in a form in which the receiver is directly connected to the exciter, or may be in a form in which the exciter is connected to the receiver by using an intermediate node. That the exciter is bound to the receiver may be understood as that the receiver forms a mapping relationship with the exciter managed by the receiver, and not be understood that receiver is directly connected to the exciter.

It should be noted that when the receiver is deployed on the donor node, the receiver may indicate the information #2 to the receiver through the internal interface. In other words, this application includes a case in which the receiver is integrated into an internal function module of the donor node, and the donor node indicates the information #2 to the receiver through the internal interface.

In a possible implementation, S840: The donor node sends identification information (an example of third information) of the receiver to the exciter.

The identification information of the receiver is information that enables the exciter to recognize or identify the receiver.

Optionally, when information related to the receiver is not pre-configured on the exciter, that is, the exciter does not know information related to the receiver, the donor node sends the identification information of the receiver to the exciter after determining the receiver and the topology #1. Optionally, the donor node further sends position information of the receiver to the exciter.

The identification information of the receiver may indicate the exciter to be bound to the receiver. The position information may enable the exciter to communicate with the correct receiver subsequently. The position information may be represented in a plurality of manners. For example, the position information is represented by using the IAB node on which the receiver is located, for example, the position information is represented by using information about a path to the receiver or information about a next-hop node. The IAB node may be represented in a plurality of manners, for example, represented by using the identification information of the IAB node described above, for example, represented by using an IP address or a MAC address.

It should be noted that, when the exciter may determine the position information of the receiver based on the identification information of the receiver, the exciter does not need to additionally obtain the position information of the receiver.

Optionally, the exciter may actively establish the connection to the receiver based on the identification information or position information of the receiver.

Therefore, according to this implementation of this application, the donor node can also flexibly select an appropriate receiver to establish the topology relationship between the receiver and the exciter.

It should be noted that, the donor node may construct an RLC link between IAB nodes from top to bottom, and configure BAP layer link routing information, for example, perform configuration in a form of a routing table, so that uplink and downlink data of the IAB nodes can be correctly forwarded. Subsequently, the IAB-Node-DU may be connected to the donor-CU through an F1 interface. Subsequently, communication between the receiver and the exciter may be performed by using an F1-C/F1-U/RRC protocol, or an SCTP/a tunnel user plane (general packet radio service tunnel protocol user plane, GTPU). Alternatively, communication is performed directly based on the IP/transmission control protocol (transmission control protocol, TCP)/UDP.

A specific process of establishing a link and configuring a route may be similar to that in the conventional technology. To avoid repetition, detailed description thereof is omitted herein.

Descriptions are provided below by using examples with reference to (a) and (b) in FIG. 7. The donor node may determine, based on the load information of the receiver, the information about the maximum quantity of exciters supported by the receiver, or position information of the exciter A and the exciter B, to bind the receiver to the exciter A and the exciter B, and form a topology form in (b) in FIG. 7, or when the receiver, the exciter A, and the exciter B are already in a topology form in (a) in FIG. 7, the donor node may adjust the topology to the topology form in (b) in FIG. 7 based on information related to the topology. When the donor node determines the topology form in (b) in FIG. 7, the donor node sends binding information between the receiver and the receiver A and the receiver B to the receiver through the internal interface. When the exciter A and the exciter B do not preset the information related to the receiver, the donor node sends the identification information of the receiver to the exciter A and the exciter B. Therefore, the receiver can subsequently communicate with the exciter A and the exciter B based on the topology. The foregoing description is merely an understanding description, and is not intended to limit this application.

According to this embodiment of this application, the exciter is deployed on the IAB node, and the receiver is deployed on the donor node. The donor node can manage the receiver and the receiver in a centralized manner, and can determine or adjust the topology between the receiver and the exciter based on the status information of the receiver and/or the status information of the exciter; and the receiver and the exciter perform communication based on the topology. That is, a binding relationship between the receiver and the exciter is not statically configured, and the donor node can flexibly adjust which receivers are bound to which exciters and how the receivers communicate with the exciters.

Figure 9:
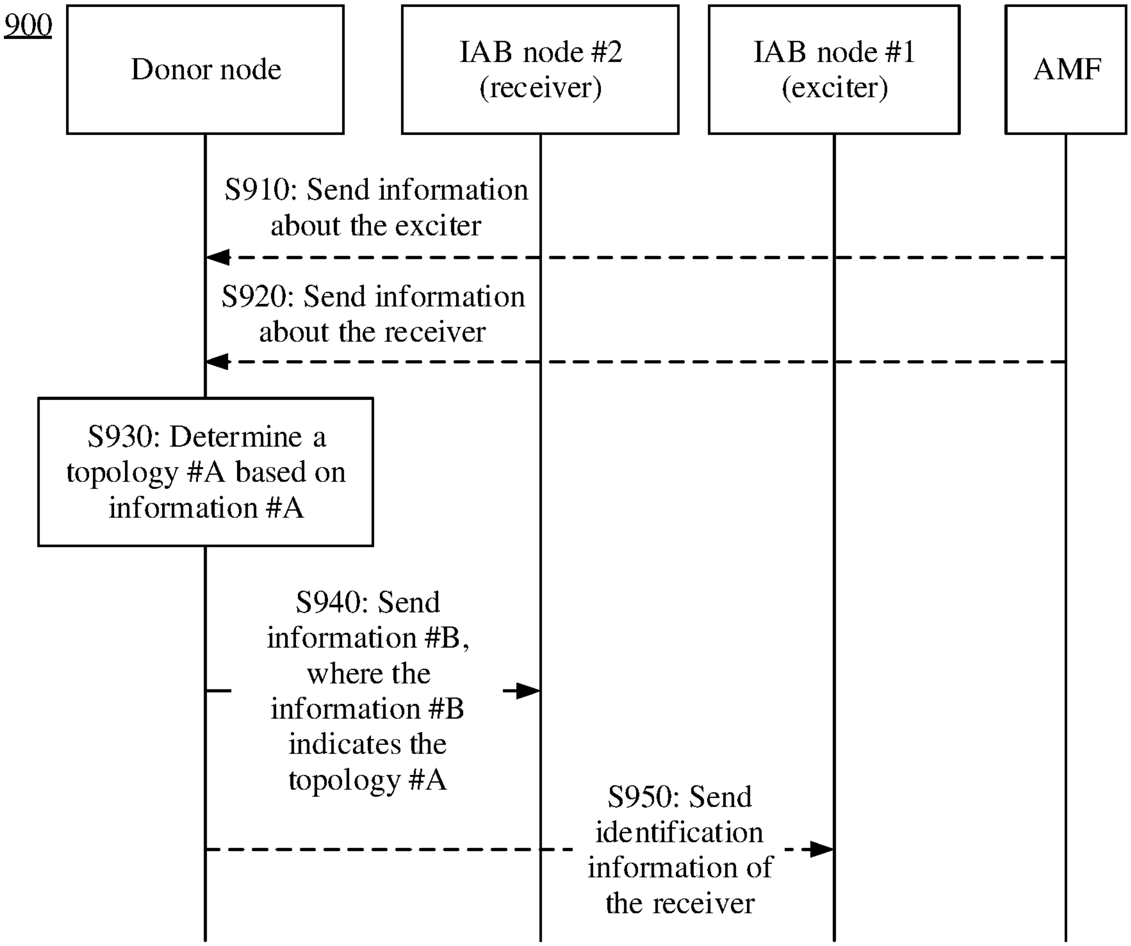
FIG. 9 is a schematic flowchart of another example of determining a topology between a receiver and an exciter.

FIG. 9 shows a schematic procedure of a method 900 according to this application when a receiver is deployed on an IAB node. In the method 900, an exciter is deployed on an IAB node #1 (an example of a first distributed node) and the receiver is deployed on the IAB node #2 (an example of a second distributed node).

In a possible implementation, S910: A donor node receives information (an example of ninth information) about the exciter from an AMF network element.

A process in which the AMF network element sends the information about the exciter to the donor node is consistent with content described in S810 in the method 800, and details are not described herein again.

In a possible implementation, S920: The donor node receives information (an example of sixth information) about the receiver from the AMF network element.

It should be noted that when the receiver is deployed on the IAB node #2, the information about the receiver may be information about the IAB node #2 on which the receiver is deployed.

The AMF network element may send the information about the receiver to the donor node when the AMF network element authorizes the receiver or may send the information about the IAB node #2 and the information about the exciter together to the donor node when the AMF network element authorizes the IAB node #2. That is, in an IAB scenario, after an IAB function is authorized, the AMF network element may send an IAB authorization indication to the donor node by using an N2 message, and the AMF network element may also include the information about the receiver in the N2 message and send the information about the receiver to the donor node.

S930: The donor node determines a topology #A (another example of a first topology) between the exciter and the receiver based on information #A (another example of first information).

A process in which the donor node determines the topology #A between the exciter and the receiver based on the information #A is similar to a process in which the donor node determines the topology #1 between the exciter and the receiver based on the information #1 in the method 800, and details are not described herein again.

It should be noted that, in the method 900, the exciter and the receiver each are deployed on an IAB node. When the donor node needs to construct a mapping relationship between the receiver and the exciter, a representation form may be constructing a mapping relationship between an identifier of the receiver and an identifier of the exciter, where an identifier of the IAB node #1 may be used to replace the identifier of the exciter, and the identifier of the IAB node #2 may be used to replace the identifier of the receiver. An identifier of an IAB node may be an MT identifier (for example, a C-RNTI or a 5G-S-TMSI) or a DU identifier (for example, an RNL/TNL ID).

S940: The donor node sends information #B (another example of second information) to the receiver, where the information #B indicates the topology #A.

Description of the information #B indicating the topology #A is similar to the description of the information #2 indicating the topology #1 in the method 800, and details are not described herein again.

In a possible implementation, S950: The donor node sends identification information (an example of third information) of the receiver to the exciter.

Optionally, when information related to the receiver is not pre-configured on the exciter, the donor node may send the identification information of the receiver, or the identification information and position information of the receiver to the exciter. Description of the identification information and the position information is similar to the foregoing description, and details are not described herein again.

Optionally, after receiving the identification information of the receiver, the donor node may send the information about the exciter to the receiver, and then the receiver may actively establish a connection to the exciter.

When the exciter and the receiver each are deployed on the IAB node, both the information #B sent to the receiver and the identification information of the receiver sent to the exciter may be sent by using an F1-C, F1-U, or RRC message.

It should be noted that, in an IAB system, the IAB node sends information to the donor node by default. Therefore, the donor node may update BAP routes of the exciter, the receiver, and a related intermediate node, to ensure normal communication between the receiver and the exciter. Subsequently, communication between the exciter and the receiver can be addressed by a BAP layer based on an IP address.

According to this embodiment of this application, the exciter and the receiver each are deployed on the IAB node. The donor node can manage the exciter and the receiver in a centralized manner, and can determine or adjust the topology between the receiver and the exciter based on the status information of the receiver and/or the status information of the exciter; and the receiver and the exciter perform communication based on the topology. That is, a binding relationship between the receiver and the exciter is not statically configured, and the donor node can flexibly adjust which receivers are bound to which exciters and how the receivers communicate with the exciters.

In both the method 800 and the method 900, the exciter and the receiver are deployed in nodes in the IAB system. The IAB node needs to request the AMF network element to obtain authorization. Therefore, the IAB node on which the exciter is deployed can also request the AMF network element to obtain authorization of the exciter. By way of example and not limitation, FIG. 10 shows a schematic procedure of an example of a method 1000 of an authorization process of an exciter.

Figure 10:
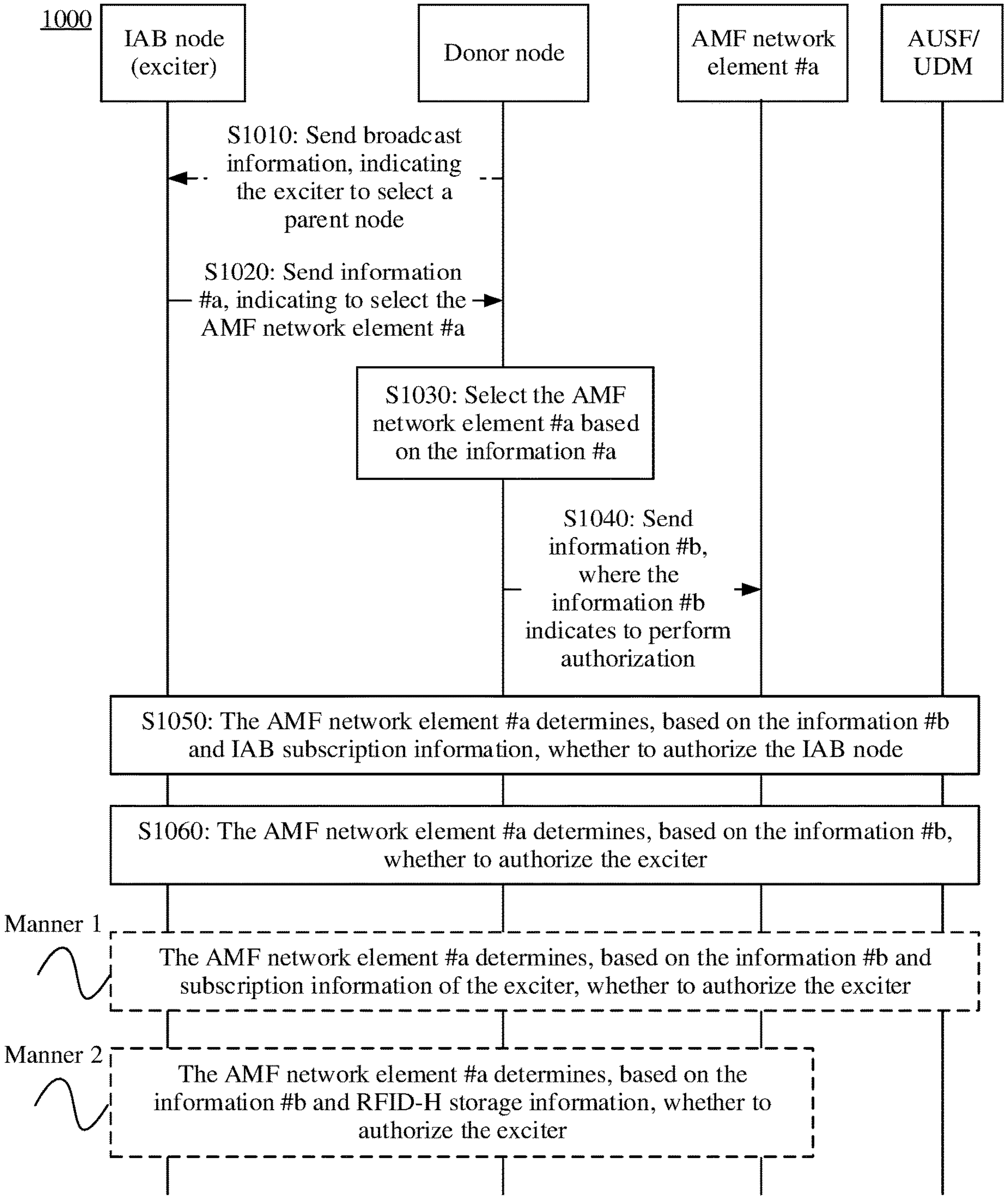
FIG. 10 is a schematic flowchart of an example of authorization of an exciter.

As shown in FIG. 10, the method 1000 may include S1010 to S1060, where Slow is optional. In this embodiment of this application, operations in the method 800 and the method 900 may be performed after operations S1010 to S1060 are performed.

The method 1000 may be applied to a solution in which the exciter is deployed on an IAB node.

Optionally, Slow: A donor node sends broadcast information, where the broadcast information indicates the exciter to select a parent node.

The exciter receives the broadcast information. When the IAB nodes on which the exciter is deployed are cascaded, the information broadcast by the donor node may be referred to. When selecting the parent node (performing DU selection), the IAB node on which the exciter is deployed may preferentially select the parent node indicated by the broadcast information.

For example, when a receiver is deployed on the donor node, the broadcast information includes information that the donor node has a capability of the receiver. After receiving the information, the exciter selects the donor node having the capability of the receiver as the parent node. In this case, a binding topology between the local receiver and exciter can be optimized, and complexity of an operation of determining the topology relationship in the method 800 and the method 900 is reduced.

S1020: The exciter sends information #a (an example of seventh information) to the donor node, where the information #a includes authorization capability information of the exciter, and the information #a indicates the donor node to select an AMF network element #a (an example of a second AMF network element).

In a possible implementation, the IAB node on which the exciter is deployed includes the information #a in an RRC setup complete message. The information #a may further include authorization capability information of the IAB node. The authorization capability information of the IAB node is used by the donor node to select an AMF network element supporting IAB authorization, and the authorization capability information of the exciter is used by the donor node to select an AMF network element supporting authorization of the exciter. That is, after receiving the information #a from the exciter, the donor node may select an AMF network element that supports both IAB authorization and authorization of the exciter.

It should be noted that the donor node may perform IAB configuration on the IAB node on which the exciter is deployed. A configuration operation process may be similar to that in the conventional technology. A difference lies in that, an RRC message (for example, an RRC setup request or UL RRC transfer) may be used to carry an identifier of the exciter, and the identifier of the exciter may also be replaced by an existing RAN ID. A specific process is not described herein again.

S1030: The donor node selects the AMF network element #a based on the information #a, where the AMF network element #a supports authorization of the exciter, and subsequently may be configured to perform a procedure of IAB authorization and authorization of the exciter.

S1040: The donor node sends information #b (an example of eighth information) to the AMF network element #a, to indicate the AMF network element #a to perform authorization.

In a possible implementation, the information #b includes the authorization capability information of the IAB node and the authorization capability information of the exciter. For example, the donor node may include the authorization capability information of the IAB node and the authorization capability information of the exciter in an N2 message and send the message to the AMF network element #b for the AMF network element to perform a corresponding authorization procedure.

It should be noted that the information #a and the information #b may be the same or different. For example, the information #b may be generated based on the information #a.

S1050: The AMF network element #a determines, based on the information #b and IAB subscription information, whether to authorize the IAB node.

After receiving the information #b, the AMF network element #a determines, based on the IAB node subscription information obtained from a UDM network element or a UDR network element and/or a local policy, whether to authorize an IAB function. This operation may be similar to that in the conventional technology, and details are not described herein again.

S1060: The AMF network element #a determines, based on the information #b, whether to authorize the exciter. Manners of determining, by the AMF network element #a, whether authorization is performed include but are not limited to the following manners:

Manner 1

After receiving the information #b, the AMF network element #a determines, based on subscription information of the exciter obtained from the UDM network element or the UDR network element, whether to allow authorization of a function of the exciter.

Manner 2

After receiving the information #b, the AMF network element #a may obtain related storage information from a dedicated network element RFID-H, and determine whether to authorize a function of the exciter. It should be noted that the RFID-H herein indicates a functional network element newly deployed in a core network, and is specifically responsible for an RFID-related function, for example, a function such as authentication, authorization, and counting/a tag read/write agent.

S1070: The AMF network element #a sends information (an example of the ninth information) about the exciter to the donor node.

Therefore, in this embodiment of this application, in an authorization process of the IAB node, authorization of the exciter can be synchronously performed, so that the IAB node can obtain permission to enable/use a capability of the exciter.

In the method 900, the receiver is deployed on the IAB node. The IAB node needs to request the AMF network element to obtain authorization. Therefore, the IAB node on which the receiver is deployed may also request the AMF network element to obtain authorization of the receiver. By way of example and not limitation, FIG. 11 shows a schematic procedure of an example of a method 1100 of an authorization process of a receiver.

Figure 11:
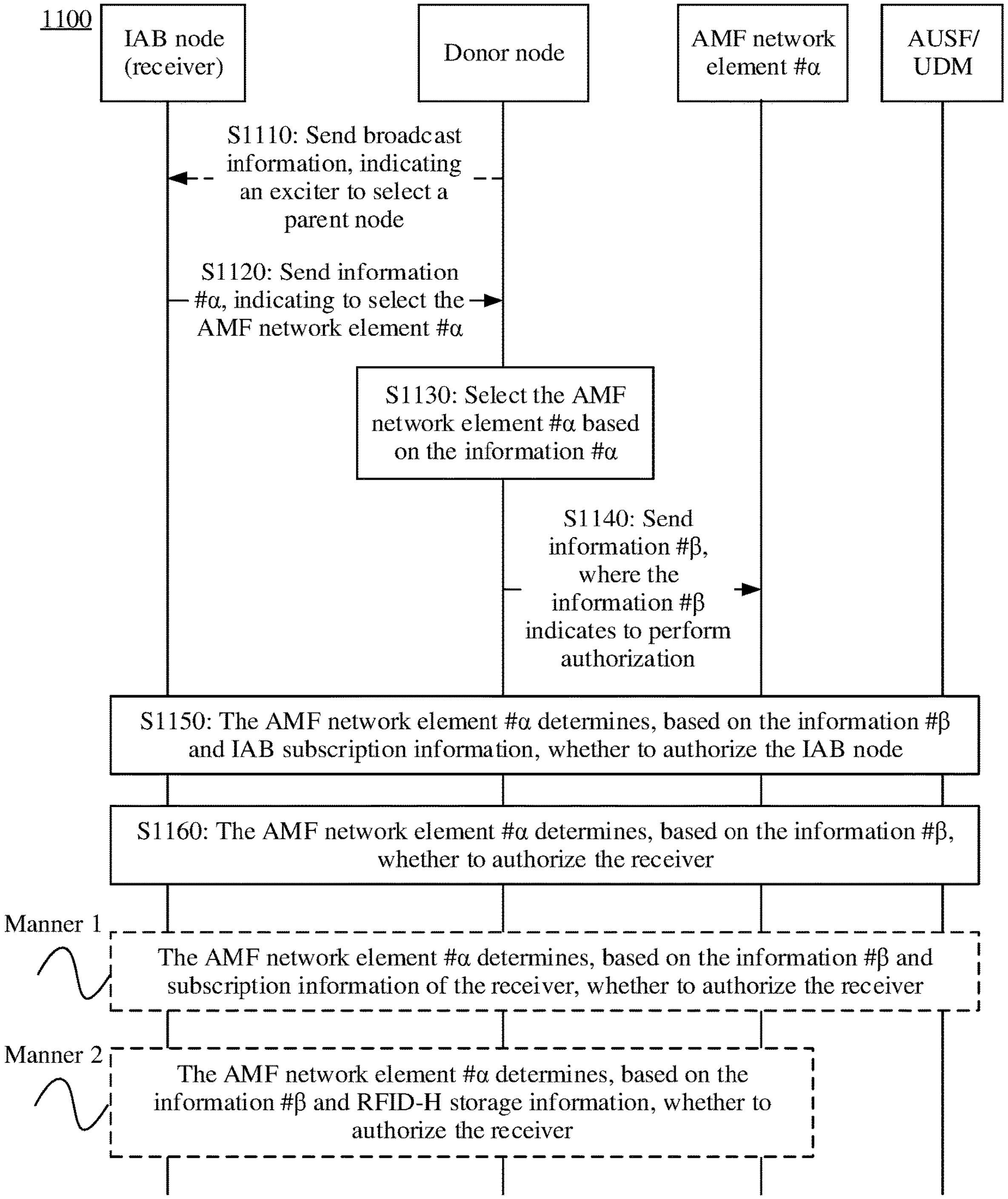
FIG. 11 is a schematic flowchart of an example of authorization of a receiver.

As shown in FIG. 11, the method 1100 may include S1110 to S1160, where S1110 is optional. Operations in the method 900 may be performed after this embodiment of this application is performed.

It should be noted that the authorization process of the receiver in the method 1100 is similar to the authorization process of the exciter in the method 1000. Therefore, for brevity, only the authorization process of the receiver is briefly described below.

Optionally, S1110: A donor node sends broadcast information to the receiver, where the broadcast information indicates the receiver to select a parent node.

S1120: The receiver sends information #α (an example of fourth information) to the donor node, where the information #α includes authorization capability information of the receiver, and the information #α indicates the donor node to select an AMF network element #α (an example of a first AMF network element).

S1130: The donor node selects the AMF network element #α based on the information #α, where the AMF network element #α supports authorization of the receiver, and subsequently may be configured to perform a procedure of IAB authorization and authorization of the receiver.

S1140: The donor node sends information #β (an example of fifth information) to the AMF network element #α, to indicate the AMF network element #α to perform authorization.

S1150: The AMF network element #α determines, based on the information #β and IAB subscription information, whether to authorize the IAB node.

S1160: The AMF network element #α determines, based on the information #β, whether to authorize the receiver.

S1170: The AMF network element #α sends information (an example of sixth information) about the receiver to the donor node. Manners of determining, by the AMF network element #β, whether authorization is performed include but are not limited to the following manners:

Method α

After receiving the information #β, the AMF network element #α determines, based on subscription information of the receiver obtained from a UDM network element or a UDR network element, whether to authorize a function of the receiver.

Manner β

After receiving the information #β, the AMF network element #α may obtain related storage information from a dedicated network element RFID-H, and determine whether to authorize a function of the exciter.

Therefore, in this embodiment of this application, in an authorization process of the IAB node, authorization of the receiver can be synchronously performed, so that the IAB node can obtain permission to enable/use a capability of the receiver.

The foregoing describes in detail the wireless communication method in embodiments of this application. The following describes a wireless communication apparatus provided in embodiments of this application.

Figure 12:
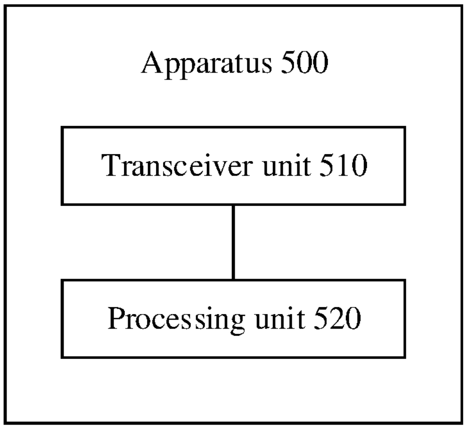
FIG. 12 to FIG. 15 are schematic diagrams of possible structures of apparatuses according to embodiments of this application.

FIG. 12 is a schematic diagram of a structure of a wireless communication apparatus 500 according to this application. As shown in FIG. 12, the apparatus 500 includes a transceiver unit 510 and a processing unit 520.

The processing unit 520 is configured to determine a first topology between a receiver and an exciter based on first information, where the receiver and the exciter are used for radio frequency identification, and the first information includes status information of the receiver and/or status information of the exciter.

The transceiver unit 510 is configured to send second information to the receiver, where the second information indicates the first topology.

Optionally, the transceiver unit 510 is further configured to send third information to the exciter, where the third information indicates identification information of the receiver.

Optionally, the transceiver unit 510 is further configured to receive fourth information from the receiver, where the fourth information includes authorization information of the receiver, and the fourth information indicates a central node to select a first access and mobility management function AMF network element. The processing unit 520 is further configured to determine the first AMF network element based on the fourth information, where the first AMF network element supports authorization of the receiver. The transceiver unit 510 is further configured to send fifth information to the first AMF network element, where the fifth information indicates the first AMF network element to authorize the receiver. The transceiver unit 510 is further configured to receive sixth information from the first AMF network element, where the sixth information includes information about the receiver.

Optionally, the transceiver unit 510 is further configured to receive seventh information from the exciter, where the seventh information includes authorization information of the exciter, and the seventh information indicates the central node to select a second AMF network element. The processing unit 520 is further configured to determine the second AMF network element based on the seventh information, where the second AMF network element supports authorization of the exciter. The transceiver unit 510 is further configured to send eighth information to the second AMF network element, where the eighth information indicates the second AMF network element to authorize the exciter. The transceiver unit 510 is further configured to receive ninth information from the AMF network element, where the ninth information includes information about the exciter.

Optionally, the transceiver unit 510 is further configured to send broadcast information, where the broadcast information indicates a first distributed node and/or a second distributed node to select a parent node.

In an implementation, the apparatus 500 may be a chip or an integrated circuit.

In this case, the transceiver unit 510 may be a communication interface, for example, an input/output interface, an input interface circuit, and an output interface circuit. The processing unit 520 may be a processor.

In another implementation, the apparatus 500 may totally correspond to the central node in the method embodiment of this application. Each unit included in the apparatus 500 is configured to implement a corresponding operation and/or processing performed by the central node in each method embodiment.

In this case, the transceiver unit 510 may be a transceiver. The transceiver includes a transmitter and a receiver, and has both receiving and sending functions. The processing unit 520 may be a processor.

Figure 13:
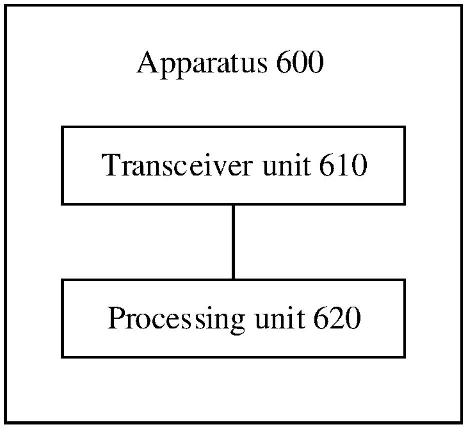

FIG. 13 is a schematic diagram of a structure of a wireless communication apparatus 600 according to this application. As shown in FIG. 13, the apparatus 600 includes a transceiver unit 610 and a processing unit 620.

The transceiver unit 610 is configured to receive third information from a central node, where the third information indicates identification information of a receiver, the receiver is determined by the central node based on first information, the receiver and an exciter are used for radio frequency identification, and the first information includes status information of the receiver and/or status information of the exciter.

Optionally, the transceiver unit 610 is further configured to send seventh information to the central node, where the seventh information includes authorization information of the exciter, the seventh information indicates the central node to select a second AMF network element, and the second AMF network element supports authorization of the exciter.

Optionally, the transceiver unit 610 is further configured to receive broadcast information from the central node, where the broadcast information indicates the exciter to select a parent node.

In an implementation, the apparatus 600 may be a chip or an integrated circuit.

In this case, the transceiver unit 610 may be a communication interface, for example, an input/output interface, an input interface circuit, and an output interface circuit. The processing unit 620 may be a processor.

In another implementation, the apparatus 600 may totally correspond to the first distributed node in the method embodiment of this application. Each unit included in the apparatus 600 is configured to implement a corresponding operation and/or processing performed by the first distributed node in each method embodiment.

In this case, the transceiver unit 610 may be a transceiver, and the transceiver includes a transmitter and a receiver. The processing unit 620 may be a processor.

Figure 14:
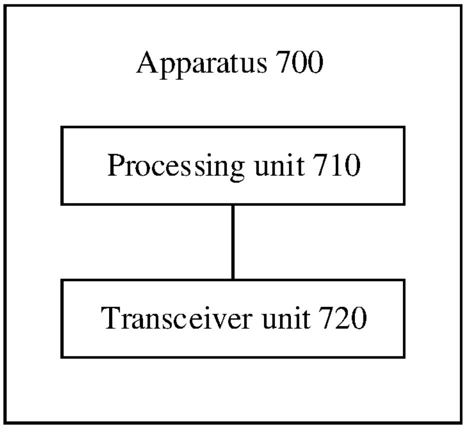

FIG. 14 is a schematic diagram of a structure of a wireless communication apparatus 700 according to this application. As shown in FIG. 14, the apparatus 700 may include a transceiver unit 710 and a processing unit 720.

The transceiver unit 720 is configured to receive second information from a central node, where the second information indicates a first topology, the first topology is determined by the central node based on first information, a receiver and an exciter are used for radio frequency identification, and the first information includes status information of the receiver and/or status information of the exciter.

The transceiver unit 720 is further configured to send fourth information to the central node, where the fourth information includes authorization information of the receiver, the fourth information indicates the central node to select a first AMF network element, and the first AMF network element supports authorization of the receiver.

The transceiver unit 720 is further configured to receive broadcast information from the central node, where the broadcast information indicates the receiver to select a parent node.

In an implementation, the apparatus 700 may be a chip or an integrated circuit.

In this case, the processing unit 710 may be a processor. The transceiver unit 720 may be a communication interface, for example, an input/output interface, an input interface circuit, and an output interface circuit.

In another implementation, the apparatus 700 may totally correspond to the second distributed node in the method embodiment of this application. Each unit included in the apparatus 700 is configured to implement a corresponding operation and/or processing performed by the second distributed node in each method embodiment.

In this case, the processing unit 710 may be a processor. The transceiver unit 720 may be a transceiver, and the transceiver includes a transmitter and a receiver.

The chip in the apparatus embodiment may be a field-programmable gate array (FPGA), an application-specific integrated chip (ASIC), a system on chip (SoC), a central processing unit (CPU), a network processor (NP), or a digital signal processor (DSP); or may be a microcontroller (micro controller unit, MCU), a programmable logic device (PLD), or another integrated chip.

In addition, this application further provides a network device woo. The following describes the network device 1000 with reference to FIG. 15.

Figure 15:
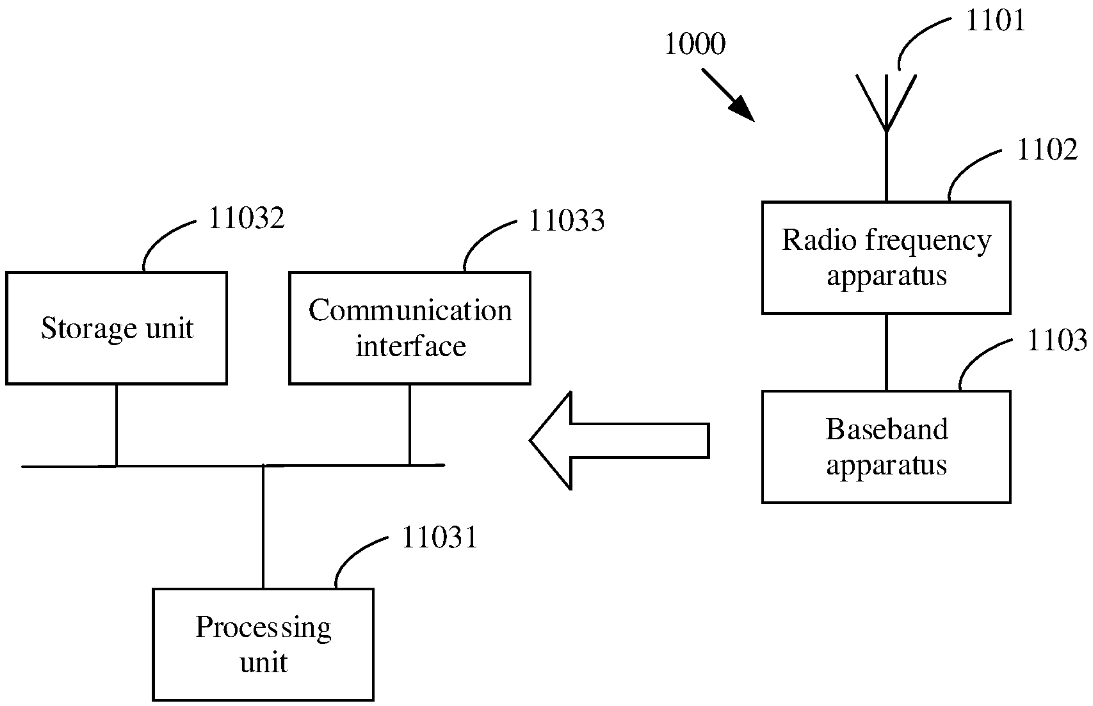

FIG. 15 is a schematic diagram of a structure of the network device 1000 according to this application. As shown in FIG. 15, the network device 1000 includes an antenna 1101, a radio frequency apparatus 1102, and a baseband apparatus 1103. The antenna 1101 is connected to the radio frequency apparatus 1102. In an uplink direction, the radio frequency apparatus 1102 receives, through the antenna 1101, a signal sent by a previous-hop network node, and sends the received signal to the baseband apparatus 1103 for processing. In a downlink direction, the baseband apparatus 1103 processes a signal that needs to be sent to a next-hop network node, and sends a processed signal to the radio frequency apparatus 1102. The radio frequency apparatus 1102 sends the signal through the antenna 1101.

The baseband apparatus 1103 may include one or more processing units 11031. In addition, the baseband apparatus 1103 may further include a storage unit 11032 and a communication interface 11033. The storage unit 11032 is configured to store a computer program and data. The communication interface 11033 is configured to exchange information with the radio frequency apparatus 1102. The communication interface 11033 may be an input/output interface or an input/output circuit.

Optionally, when the apparatus 500 totally corresponds to the central node, the structure of the apparatus 500 may be the network device 1000 shown in FIG. 13. For example, the transceiver unit 510 may be implemented by the radio frequency apparatus 1102, and the processing unit 520 may be implemented by the baseband apparatus 1103.

For example, the baseband apparatus 1103 is configured to determine a first topology between a receiver and an exciter based on first information, where the receiver and the exciter are used for radio frequency identification, and the first information includes status information of the receiver and/or status information of the exciter. The radio frequency apparatus 1102 is configured to send second information to the receiver through the antenna 1101, where the second information indicates the first topology.

Optionally, when the apparatus 600 totally corresponds to the first distributed node, the structure of the apparatus 600 may also be the network device 1000 shown in FIG. 13. For example, the transceiver unit 610 may be implemented by the radio frequency apparatus 1102, and the processing unit 620 may be implemented by the baseband apparatus 1103.

For example, the radio frequency apparatus 1102 is configured to receive second information from a donor CU through the antenna 1101, and send the second information to the baseband apparatus 1103 through the communication interface 11033.

Optionally, when the apparatus 700 totally corresponds to the second distributed node, the structure of the apparatus 700 may also be the network device 1000 shown in FIG. 13. For example, the transceiver unit 610 may be implemented by the radio frequency apparatus 1102, and the processing unit 620 may be implemented by the baseband apparatus 1103.

For example, the radio frequency apparatus 1102 is configured to receive third information from a donor CU through the antenna 1101, and send the third information to the baseband apparatus 1103 through the communication interface 11033.

In addition, this application further provides a communication system, including one or more of the central node, the first distributed node, and the second distributed node described in the method embodiment.

This application provides a computer-readable storage medium. The computer-readable storage medium stores computer instructions. When the computer instructions are run on a computer, the computer is enabled to perform a corresponding operation and/or processing performed by the central node in any method embodiment.

This application provides a computer-readable storage medium. The computer-readable storage medium stores computer instructions. When the computer instructions are run on a computer, the computer is enabled to perform a corresponding operation and/or processing performed by the first distributed node in any method embodiment.

This application provides a computer-readable storage medium. The computer-readable storage medium stores computer instructions. When the computer instructions are run on a computer, the computer is enabled to perform a corresponding operation and/or processing performed by the second distributed node in any method embodiment.

This application further provides a computer program product. The computer program product includes computer program code. When the computer program code is run on a computer, the computer is enabled to perform a corresponding operation and/or processing performed by the central node in any method embodiment of this application.

This application further provides a computer program product. The computer program product includes computer program code. When the computer program code is run on a computer, the computer is enabled to perform a corresponding operation and/or processing performed by the first distributed node in any method embodiment of this application.

This application further provides a computer program product. The computer program product includes computer program code. When the computer program code is run on a computer, the computer is enabled to perform a corresponding operation and/or processing performed by the second distributed node in any method embodiment of this application.

This application further provides a chip including a processor. The processor is configured to invoke a computer program stored in a memory and run the computer program, to perform a corresponding operation and/or processing performed by the central node in any method embodiment of this application.

Optionally, the chip further includes the memory, and the memory is connected to the processor. The processor is configured to read and execute the computer program in the memory.

Further, optionally, the chip further includes a communication interface, and the processor is connected to the communication interface. The communication interface is configured to receive a to-be-processed signal and/or data, and the processor obtains the to-be-processed signal and/or data from the communication interface, and processes the to-be-processed signal and/or data.

This application further provides a chip including a processor. The processor is configured to invoke a computer program stored in a memory and run the computer program, to perform a corresponding operation and/or processing performed by the first distributed node in any method embodiment of this application.

Optionally, the chip further includes the memory, and the memory is connected to the processor. The processor is configured to read and execute the computer program in the memory.

Further, optionally, the chip further includes a communication interface, and the processor is connected to the communication interface. The communication interface is configured to receive a to-be-processed signal and/or data, and the processor obtains the to-be-processed signal and/or data from the communication interface, and processes the to-be-processed signal and/or data.

This application further provides a chip including a processor. The processor is configured to invoke a computer program stored in a memory and run the computer program, to perform a corresponding operation and/or processing performed by the second distributed node in any method embodiment of this application.

Optionally, the chip further includes the memory, and the memory is connected to the processor. The processor is configured to read and execute the computer program in the memory.

Further, optionally, the chip further includes a communication interface, and the processor is connected to the communication interface. The communication interface is configured to receive a to-be-processed signal and/or data, and the processor obtains the to-be-processed signal and/or data from the communication interface, and processes the to-be-processed signal and/or data.

Optionally, the communication interface may be an input/output interface, and may specifically include an input interface and an output interface. Alternatively, the communication interface may be an input/output circuit, and may specifically include an input interface circuit and an output interface circuit The memory and the memory in the foregoing embodiments may be physically independent units, or the memory may be integrated with the processor.

In an implementation, when the network device is a central node, the network device may implement an operation and/or processing performed by the central node in the foregoing method embodiment in a form of invoking a program by the processing unit. For example, the processing unit 11031 invokes a program stored in the storage unit 11032, to perform an operation and/or processing performed by the central node in the foregoing method embodiment. The storage unit 11032 may be a storage element located on a same chip as the processing unit 11031, that is, an on-chip storage unit, or may be a storage element located on a different chip from the processing unit 11031, that is, an off-chip storage unit.

In another implementation, when the network device is a first distributed node, the network device may implement an operation and/or processing performed by the first distributed node in the foregoing method embodiment by invoking a program by the processing unit.

In still another implementation, when the network device is a second distributed node, the network device may implement an operation and/or processing performed by the second distributed node in the foregoing method embodiment in a form of invoking a program by the processing unit.

In the foregoing embodiments, the processor may be a central processing unit (CPU), a microprocessor, an application-specific integrated circuit (ASIC), one or more integrated circuits configured to control execution of programs in the technical solutions of this application, or the like. For example, the processor may be a digital signal processor device, a microprocessor device, an analog-to-digital converter, or a digital-to-analog converter. The processor may allocate control and signal processing functions of a terminal device or a network device among these devices based on respective functions of these devices. In addition, the processor may have a function of operating one or more software programs, and the software programs may be stored in the memory. The functions of the processor may be implemented by hardware, or may be implemented by hardware executing corresponding software. The hardware or the software includes one or more modules corresponding to the foregoing function.

The memory may be a read-only memory (ROM), another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, any other medium that can be used to carry or store expected program code in a form of an instruction or a data structure and that can be accessed by a computer, or the like.

In embodiments of this application, "and/or" describes an association relationship between associated objects, and indicates that three relationships may exist. For example, A and/or B may indicate a case in which only A exists, both A and B exist, and only B exists. A and B may be singular or plural.

A person of ordinary skill in the art may be aware that, in combination with the examples described in embodiments disclosed in this specification, units may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application.

In the several embodiments provided in this application, it should be understood that the disclosed system, apparatus and method may be implemented in other manners. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

determining, by a central node, a first topology between a receiver and an exciter based on first information, wherein a radio frequency identification (RFID) reader comprises the receiver and the exciter, wherein the exciter is deployed on a first distributed node; or the receiver is deployed on the central node; or the receiver is deployed on a second distributed node, wherein the method is applied to an integrated access and backhaul (IAB) system, the central node is a donor node in the IAB system, the first distributed node is a first IAB node in the IAB system, and the second distributed node is a second IAB node in the IAB system, and wherein the first information comprises at least one of status information of the receiver or status information of the exciter, the status information of the receiver including at least one of load information indicating current processing capacity of the receiver or information about a maximum quantity of exciters that can be bound to the receiver, or the status information of the exciter including position information of the exciter; and sending, by the central node, second information to the receiver, wherein the second information indicates the first topology, and wherein when the receiver is deployed on the second distributed node, the method further comprises:

receiving, by the central node, fourth information from the receiver, wherein the fourth information indicates the central node to select a first access and mobility management function (AMF) network element;

determining, by the central node, the first AMF network element based on the fourth information, wherein the first AMF network element supports authorization of the receiver;

sending, by the central node, fifth information to the first AMF network element, wherein the fifth information indicates the first AMF network element to authorize the receiver; and receiving, by the central node, sixth information from the first AMF network element, wherein the sixth information comprises information about the receiver.

2. The method according to claim 1, wherein the method further comprises:

sending, by the central node, third information to the exciter, wherein the third information indicates identification information of the receiver.

3. The method according to claim 1, wherein when the exciter is deployed on the first distributed node, the method further comprises:

receiving, by the central node, seventh information from the exciter, wherein the seventh information indicates the central node to select a second AMF network element;

determining, by the central node, the second AMF network element based on the seventh information, wherein the second AMF network element supports authorization of the exciter;

sending, by the central node, eighth information to the second AMF network element, wherein the eighth information indicates the second AMF network element to authorize the exciter; and receiving, by the central node, ninth information from the second AMF network element, wherein the ninth information comprises information about the exciter.

4. The method according to claim 1, wherein the method further comprises:

sending, by the central node, broadcast information, wherein the broadcast information indicates at least one of the first distributed node or the second distributed node to select a parent node.

5. A method, wherein the method comprises:

receiving, by a receiver, second information from a central node, wherein the second information indicates a first topology, the first topology is determined by the central node based on first information, and a radio frequency identification (RFID) reader comprises the receiver and an exciter, wherein the exciter is deployed on a first distributed node; or the receiver is deployed on the central node; or the receiver is deployed on a second distributed node, wherein the method is applied to an IAB system, the central node is a donor node in the IAB system, the first distributed node is a first IAB node in the IAB system, and the second distributed node is a second IAB node in the IAB system, and wherein the first information comprises at least one of status information of the receiver or status information of the exciter, the status information of the receiver including at least one of load information indicating current processing capacity of the receiver or information about a maximum quantity of exciters that can be bound to the receiver, or the status information of the exciter including position information of the exciter; and when the receiver is deployed on the second distributed node, sending, by the receiver, fourth information to the central node, wherein the fourth information indicates the central node to select a first AMF network element, and the first AMF network element supports authorization of the receiver.

6. The method according to claim 5, wherein the receiver is deployed on the central node.

7. The method according to claim 5, wherein the receiver is deployed on the second distributed node.

8. An apparatus, comprising:

a transceiver;

at least one processor; and one or more memories coupled to the at least one processor and storing programming instructions for execution by the at least one processor to cause the apparatus to:

determine a first topology between a receiver and an exciter based on first information, wherein a radio frequency identification (RFID) reader comprises the receiver and the exciter, wherein the exciter is deployed on a first distributed node; or the receiver is deployed on a central node; or the receiver is deployed on a second distributed node, wherein the apparatus is an integrated access and backhaul (IAB) system, the central node is a donor node in the IAB system, the first distributed node is a first IAB node in the IAB system, and the second distributed node is a second IAB node in the IAB system, and wherein the first information comprises at least one of status information of the receiver or status information of the exciter, the status information of the receiver including at least one of load information indicating current processing capacity of the receiver or information about a maximum quantity of exciters that can be bound to the receiver, or the status information of the exciter including position information of the exciter; and send second information to the receiver, wherein the second information indicates the first topology, and wherein when the receiver is deployed on the second distributed node, the programming instructions for execution by the at least one processor cause the apparatus to:

receive fourth information from the receiver, wherein the fourth information indicates the central node to select a first access and mobility management function (AMF) network element;

determine the first AMF network element based on the fourth information, wherein the first AMF network element supports authorization of the receiver;

send fifth information to the first AMF network element, wherein the fifth information indicates the first AMF network element to authorize the receiver; and receive sixth information from the first AMF network element, wherein the sixth information comprises information about the receiver.

9. The apparatus according to claim 8, wherein when the exciter is deployed on the first distributed node, the programming instructions for execution by the at least one processor cause the apparatus to:

receive seventh information from the exciter, wherein the seventh information indicates the central node to select a second AMF network element;

determine the second AMF network element based on the seventh information, wherein the second AMF network element supports authorization of the exciter;

send eighth information to the second AMF network element, wherein the eighth information indicates the second AMF network element to authorize the exciter; and receive ninth information from the second AMF network element, wherein the ninth information comprises information about the exciter.

10. The apparatus according to claim 8, wherein the programming instructions for execution by the at least one processor cause the apparatus to:

send third information to the exciter, wherein the third information indicates identification information of the receiver.

11. The apparatus according to claim 8, wherein the receiver is deployed on the second distributed node.

12. The apparatus according to claim 8, wherein the programming instructions for execution by the at least one processor cause the apparatus to:

send broadcast information, wherein the broadcast information indicates at least one of the first distributed node or the second distributed node to select a parent node.

13. An apparatus, comprising:

a transceiver;

at least one processor; and one or more memories coupled to the at least one processor and storing programming instructions for execution by the at least one processor to cause the apparatus to:

receive second information from a central node, wherein the second information indicates a first topology, the first topology is determined by the central node based on first information, the apparatus is or is part of a receiver, and a radio frequency identification (RFID) reader comprises the receiver and an exciter, wherein the exciter is deployed on a first distributed node; or the receiver is deployed on the central node; or the receiver is deployed on a second distributed node, wherein the apparatus is an integrated access and backhaul (LAB) system, the central node is a donor node in the IAB system, the first distributed node is a first IAB node in the IAB system, and the second distributed node is a second IAB node in the IAB system, and wherein the first information comprises at least one of status information of the receiver or status information of the exciter, the status information of the receiver including at least one of load information indicating current processing capacity of the receiver or information about a maximum quantity of exciters that can be bound to the receiver, or the status information of the exciter including position information of the exciter; and when the receiver is deployed on the second distributed node, send fourth information to the central node, wherein the fourth information indicates the central node to select a first AMF network element, and the first AMF network element supports authorization of the receiver.

14. The apparatus according to claim 13, wherein the receiver is deployed on the central node.

15. The apparatus according to claim 13, wherein the receiver is deployed on the second distributed node.

* * * * *